US007920177B2

(12) United States Patent
Okabe

(10) Patent No.: US 7,920,177 B2
(45) Date of Patent: Apr. 5, 2011

(54) IMAGING APPARATUS

(75) Inventor: Yoshimasa Okabe, Katano (JP)

(73) Assignee: Panasonic Corporation, Osaka (JP)

( * ) Notice: Subject to any disclaimer, the term of this patent is extended or adjusted under 35 U.S.C. 154(b) by 1521 days.

(21) Appl. No.: 11/111,634

(22) Filed: Apr. 21, 2005

(65) Prior Publication Data
US 2006/0044418 A1 Mar. 2, 2006

(30) Foreign Application Priority Data

Apr. 23, 2004 (JP) .................................. 2004-127811

(51) Int. Cl.
*H04N 5/76* (2006.01)
(52) U.S. Cl. ................ 348/231.9; 348/231.6; 348/231.2; 348/231.99
(58) Field of Classification Search ............. 348/207.99, 348/231.99, 231.1, 231.2, 231.3, 231.6, 231.7, 348/231.9
See application file for complete search history.

(56) References Cited

U.S. PATENT DOCUMENTS

| 4,888,688 | A | * | 12/1989 | Hartvigsen et al. | ........... 711/207 |
| 5,384,900 | A | * | 1/1995 | Sato et al. | ..................... 345/556 |
| 5,412,780 | A | | 5/1995 | Rushton | |
| 6,434,103 | B1 | | 8/2002 | Shitara et al. | |
| 6,469,799 | B1 | * | 10/2002 | Kajita | ........................... 358/1.16 |
| 6,742,103 | B2 | * | 5/2004 | Chauvel et al. | ............... 711/207 |
| 7,055,015 | B2 | * | 5/2006 | Shiota | ........................... 711/203 |

| 7,295,231 | B1 | 11/2007 | Kaku |
| 2002/0031349 | A1 | 3/2002 | Hayashi |
| 2003/0122952 | A1 | 7/2003 | Kuroiwa |
| 2004/0120690 | A1 | 6/2004 | Takeshita et al. |

FOREIGN PATENT DOCUMENTS

| JP | 2-287611 | 11/1990 |
| JP | 4-167147 | 6/1992 |
| JP | 5-056321 | 3/1993 |
| JP | 5-173719 | 7/1993 |
| JP | 2000-125168 A | 4/2000 |
| JP | 2000-339207 A | 12/2000 |
| JP | 2001-57647 | 2/2001 |
| JP | 2001-320608 A | 11/2001 |
| JP | 2002-074276 A | 3/2002 |
| JP | 2002-152573 | 5/2002 |
| JP | 2003-198914 A | 7/2003 |
| JP | 2004-070799 A | 3/2004 |
| JP | 2004-70799 A | 3/2004 |

* cited by examiner

*Primary Examiner* — David L Ometz
*Assistant Examiner* — Peter Chon
(74) *Attorney, Agent, or Firm* — RatnerPrestia

(57) ABSTRACT

The imaging apparatus includes a plurality of image processing circuits, a memory having real address space, a memory management unit that performs virtual memory control, and a CPU that controls the image processing circuits. Each image processing circuit has a function of specified data processing, and writes/reads data to/from the memory in virtual address space. The memory management unit has corresponding information for managing correspondence between specified data unit region (virtual page) in virtual address space, and specified data unit region (real page) in real address space, and deletes the correspondence between virtual page and real page concerning the read data in the corresponding information when the image processing circuit completes the read operation of the data in specified data unit from the memory.

17 Claims, 16 Drawing Sheets

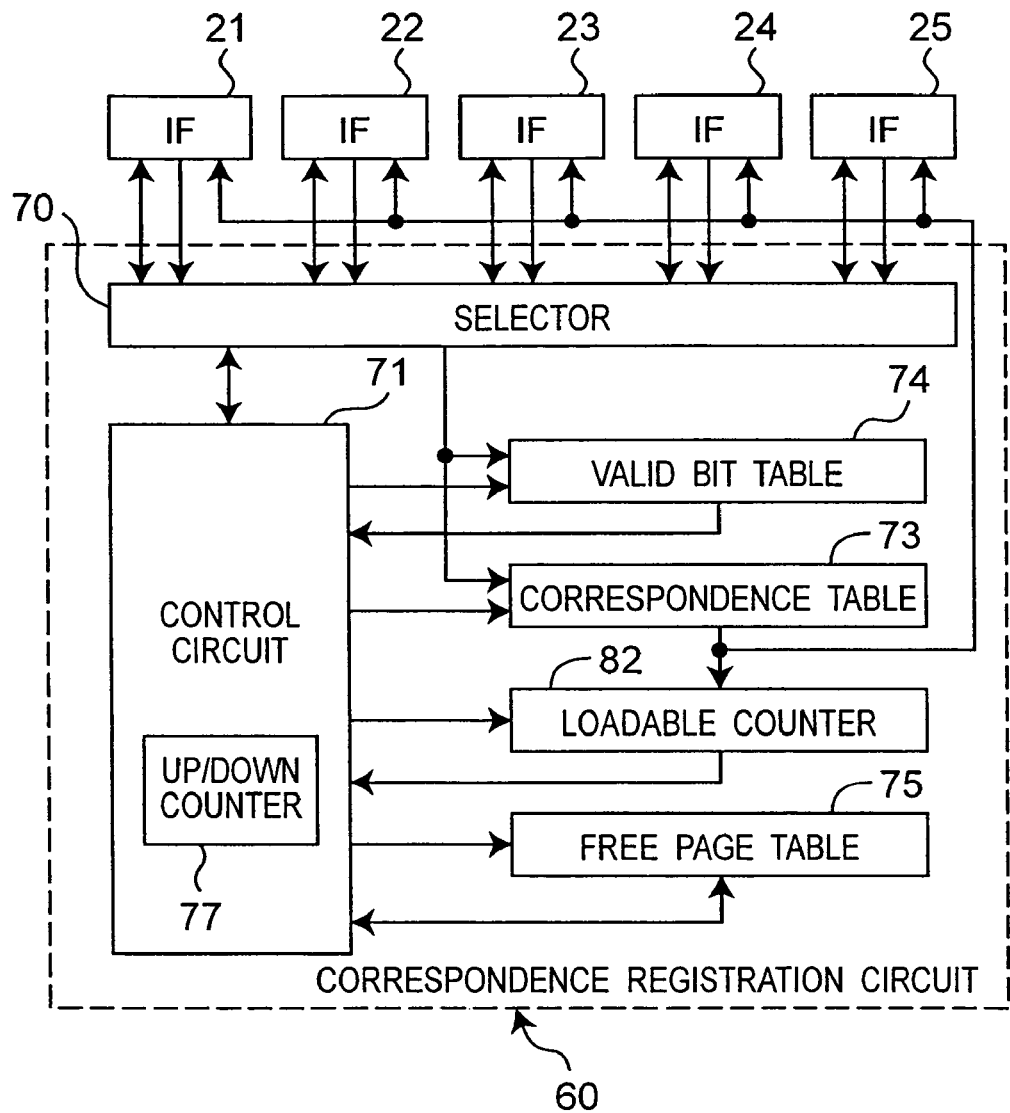

Fig.9A (CORRESPONDENCE MAP)

| VIRTUAL PAGE | REAL PAGE |
|---|---|
| 1 | 10 |
| 3 | 3 |
| 4 | 4 |
| ... | ... |
| ... | ... |
| ... | ... |
| n-1 | 99 |
| n | 100 |

Fig.9B (VALID BIT TABLE)

| VIRTUAL PAGE | REAL PAGE |
|---|---|
| 0 | 0 |
| 1 | 1 (REAL PAGE EXISTS) |
| 2 | 0 |
| ... | ... |
| ... | ... |
| ... | ... |
| n-1 | 1 |
| 0 | 0 |

Fig.9C (FREE PAGE TABLE)

| REAL PAGE | BIT VALUE |
|---|---|
| 0 | 0 |
| 1 | 0 |
| 2 | 1(FREE) |
| ... | ... |
| ... | ... |
| ... | ... |
| n-1 | 0 |
| 0 | 1 |

IMAGING APPARATUS

BACKGROUND OF THE INVENTION

1. Field of the Invention

The present invention relates to an imaging apparatus such as digital camera, and more particularly to an imaging apparatus having a memory management unit for managing a virtual memory.

2. Related Art

A digital camera has recently made drastic technical progress, and is going to surpass the conventional film type camera on market. Concerning continuous shooting, film type camera has a problem with taking time in winding up the film. Continuous shooting with digital camera provides a problem that further image cannot be taken while image data is being written into recording medium. Several technologies have been proposed as measures for solving such problem in digital camera.

For example, patent document 1 discloses an imaging apparatus in which the maximum number of images that can be recorded in temporary storage device has been set, the number of stored images is counted, and if the counted number of images is less than the maximum number of images that can be recorded in temporary storage device, then imaging is permitted. In this method, however, since the maximum number of images is determined in advance to the imaging mode, the user may often miss the shooting chance when desired to image sequentially, and the temporary storage device may not be always utilized to the maximum extent.

Patent document 2 discloses a configuration for controlling the number of images of continuous shooting depending on the duration of pressing of imaging button, in addition to the configuration of patent document 1. In this case, however, the number of images of continuous shooting is limited by the maximum number of recordable images, the number of images of continuous shooting depends on the delicate control by the finger tip, and the configuration is hard to use. The image data is compressed and converted, and the processing time of compression and conversion is longer than the taking time of one image. In this configuration, therefore, two memories for storing data are provided before and after the compressing and converting circuit, thus to allow continuous shooting until one memory is fully filled up. However, if the memory is filled up, continuous shooting is stopped if continued to press the shutter release button.

Patent document 1: JP 2002-152573A
Patent document 2: JP 2001-57647A

These prior arts are commonly controlled to manage the memory capacity by the number of images, not by the memory capacity, and hence the number of images in continuous shooting is limited, and flexibility of operation of the imaging apparatus is not sufficient.

SUMMARY OF THE INVENTION

The invention is devised to solve these problems, and it is hence an object thereof to present an imaging apparatus capable of taking as many images as possible in continuous shooting, by improving the memory management in the imaging apparatus.

To solve the problems, the invention employs virtual memory management technique, applies the concept of memory management unit (MMU) in a specific form in an imaging apparatus, and manages the storage capacity of the storage device moment by moment in units of pages.

In a first aspect of the invention, an imaging apparatus for taking images and recording them as digital data, includes a memory that stores image data and having real address space, an image processing circuit that has a specified image data processing function and writes and/or reads data in specified data unit in the memory by using virtual address space, a memory management unit that performs virtual memory control for managing the address of the memory by relating the real address space to the virtual address space, and a CPU that controls the image processing circuit.

The memory management unit includes an interface circuit that converts virtual address specified by the image processing circuit into real address, and a correspondence registration circuit. The correspondence registration circuit has corresponding information for managing the correspondence between a virtual address unit region and a real address unit region, and sends the information about the real address unit region corresponding to the virtual address unit region in response to inquiry from the interface circuit, in which the virtual address unit region is a region of specified data unit in the virtual address space and the real address unit region is a region of specified data unit in the real address space. When the image processing circuit completes data read operation from the memory in specified data unit, the memory management unit deletes the correspondence between virtual address unit region and real address unit region for the read data in the corresponding information.

In a second aspect of the invention, an imaging apparatus for taking images and recording them as digital data, includes a plurality of image processing circuits, a memory that stores image data and having real address space, a memory management unit that performs virtual memory control for managing the address of the memory by relating the real address space to the virtual address space, and a CPU that controls the image processing circuits. Each image processing circuit has a specified image data processing function and writes and/or reads data in specified data unit in the memory by using virtual address space.

The memory management unit includes: a plurality of interface circuits each of which is provided for each imaging circuit and converts virtual address specified by the image processing circuit into real address, a correspondence registration circuit, and an arbiter circuit that adjusts access right to the corresponding registering circuit among the plural interface circuits.

The correspondence registration circuit that has corresponding information for managing the correspondence between a virtual address unit region and a real address unit region, and sends the information about the real address unit region corresponding to the virtual address unit region in response to inquiry from the interface circuit, in which the virtual address unit region is a region of specified data unit in the virtual address space and the real address unit region is a region of specified data unit in the real address space. When the image processing circuit completes data read operation from the memory in specified data unit, the memory management unit deletes the correspondence between virtual address unit region and real address unit region for the read data in the corresponding information.

According to the imaging apparatus of the invention, the virtual address space larger than the real address space of the memory is related to the real address space by the virtual memory management. Immediately after reading data from the memory, the corresponding information about the read data between the virtual address region and real address region is cancelled. As a result, unnecessary data is not accumulated in the memory, and the free capacity of real address space is assured to be sufficient, and thereby many images can be taken.

The imaging apparatus of the invention may monitor the free capacity of the memory in page unit, and permit imaging operation if there is a free capacity larger than the storage capacity necessary for taking at least one picture. As a result, even after continuous shooting, the user will not miss the shooting chance, or if imaging is not permitted immediately, a normal imaging state can be recovered in a shorter time than in the conventional imaging apparatus.

The imaging apparatus of the invention may access a free page table in a period for which there is no access from the interface circuit, and always search for a real page not having corresponding virtual page so as to be ready for next access request. In this manner, by making use of a period with no access from the interface circuit to search preliminarily and prepare a real page not having corresponding virtual page prior to request from the interface circuit, the real page number can be replied immediately when the interface circuit requests to search for free real page. As a result, when registering the correspondence between real page and virtual page, the waiting time of the interface circuit for processing can be substantially shortened.

BRIEF DESCRIPTION OF DRAWINGS

FIG. 8 is a block diagram of a correspondence registration circuit.

FIG. 9A is a block diagram of a correspondence table.

FIG. 9B is a block diagram of a valid bit table.

FIG. 9C is a block diagram of a free page table.

DETAILED DESCRIPTION OF PREFERRED EMBODIMENTS

Referring now to the accompanying drawings, a preferred embodiment of imaging apparatus of the invention is described below.

1. Configuration of Imaging Apparatus 1.1 Overall Configuration

Figure 1:
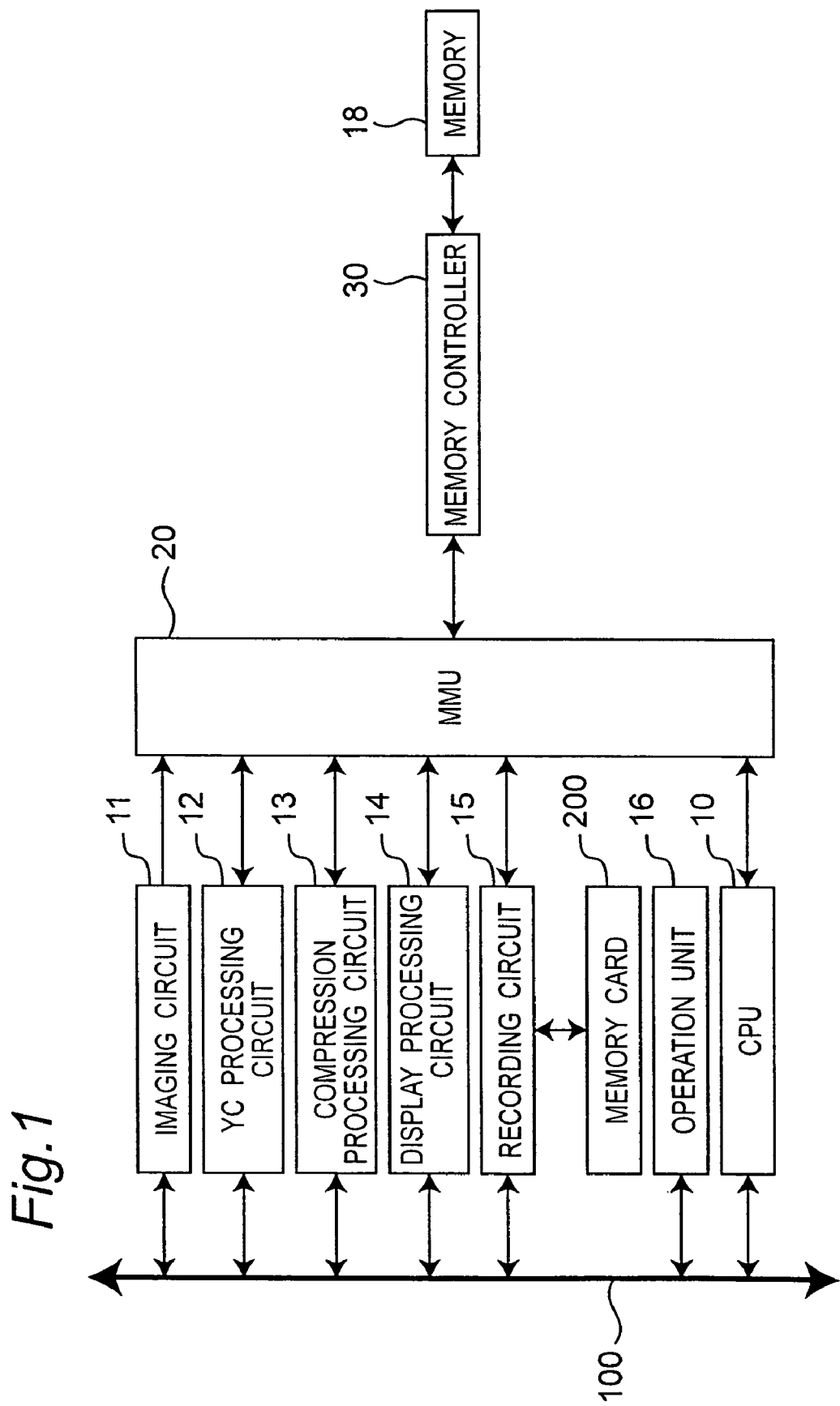
FIG. 1 is a block diagram of imaging apparatus using memory management unit of the invention.

FIG. 1 shows a configuration of imaging apparatus of the invention. The imaging apparatus includes a plurality of image processing circuits 11 to 15, a memory 18 for temporarily storing image data to be processed, a memory management unit (MMU) 20 for managing allowable capacity of the memory 18 in specified data unit or page unit, a memory controller 30 for controlling writing/reading of data to/from the memory 18, a CPU 10 for controlling the image processing circuits 11, 12, . . . , and an operation unit 16 manipulated by the user. The image processing circuits specifically include an imaging circuit 11, a YC processing circuit 12, a compression processing circuit 13, a display processing circuit 14, and a recording circuit 15.

The imaging circuit 11 is a circuit for converting optical information into an electrical signal, and it includes, for example, CCD. The imaging circuit 11 further applies white balance process to the data converted into electrical signal by the CCD, and sends out the processed data as raw data. The raw data is stored directly in storage region on the memory 18 assigned on the basis of the address control of MMU 20.

The YC processing circuit 12 is an image pre-processing device for separating the image data (raw data) into Y signal (luminance component) and C signal (chromatic component) in order to facilitate the subsequent compression process. The YC processing circuit 12 reads out the raw data processed by the imaging circuit 11 from the memory 18, separates the data into Y and C, and stores the data directly in the region on the memory 18 specified on the basis of address control by the MMU 20.

The compression processing circuit 13 compresses the image data applied with YC separation by the YC processing circuit 12. That is, the compression processing circuit 13 reads out the image data stored after YC separation from the memory 18, compresses the image in, for example, JPEG format, and stores it directly in the region on the memory 18 specified on the basis of the address control of the MMU 20.

The display processing circuit 14 includes a display device such as liquid crystal display (LCD). The display processing circuit 14 reads out the image data stored after YC separation by the YC processing circuit 12 from the memory 18, applies a predetermined process to the image, and displays it in the display device.

The recording circuit 15 records data in a recording medium 200, for example, a memory card composed of programmable semiconductor memory such as flash memory. That is, the recording circuit 15 reads out, for example, raw data processed by the imaging circuit 11 or image data compressed in JPEG format by the compression processing circuit 11, directly from the memory 18, and records the data in the recording medium 200.

The operation unit 16 is handled by the user for setting the functions of the imaging apparatus, and pressing the shutter button or operating other parts. The CPU 10 controls start and end of processing of image processing circuits 11, 12, 13, 14, 15, by way of bus 100, according to the operation on the operation unit 16.

Thus, the image data is processed sequentially by the image processing circuits 11 to 15, while accessing by way of the memory 18. At this time, the image processing circuits 11 to 15 process data in specified data unit (page unit), and access the memory 18. The image processing circuits 11 to 15 individually can operate independently of the CPU 10. The imaging circuit 11, YC processing circuit 12, and compression processing circuit 13 can execute processing for the portion of one screen on the basis of address control of the MMU 20 without the CPU 10.

The MMU 20 is a memory management unit for managing the virtual memory in page unit according to address control, and converts addresses between virtual address and real address when the image processing circuits 11, 12, 13 access the memory 18. In this address conversion, the MMU 20 suspends address relaying, and controls to permit access to the memory 18 only when succeeding in address conversion. The structure and operation of the MMU 20 are specifically described later.

The memory 18 can accept access requests from plural image processing circuits 11 to 15. The image processing circuits 11 to 15 can access the memory 18 independently and in parallel.

1.2 Virtual Memory Management

Figure 2:
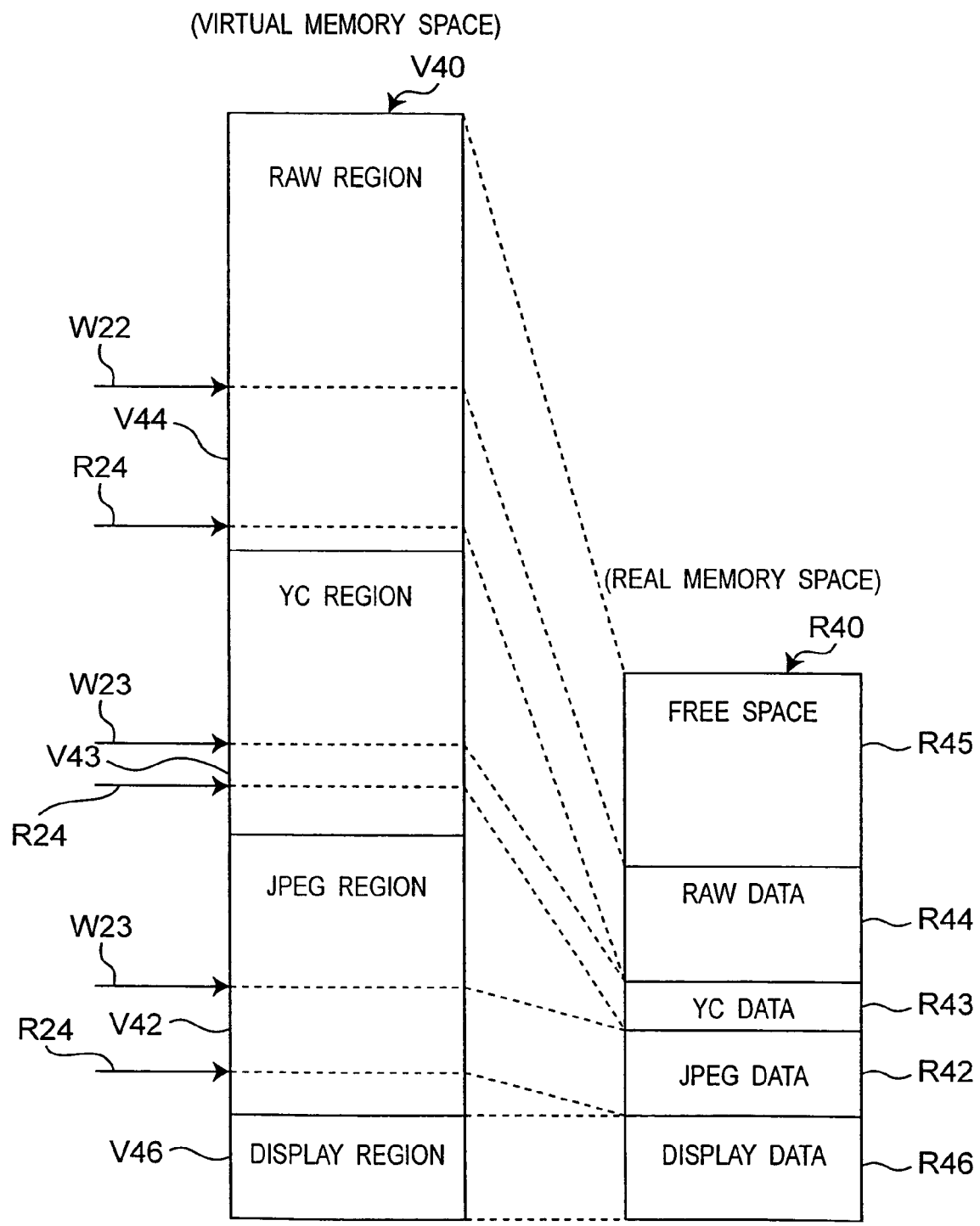
FIG. 2 is a diagram explaining correspondence between real memory space and virtual memory space.

Virtual memory management realized by MMU 20 is explained. In virtual memory management in the embodiment, as shown in FIG. 2, actual address space in memory 18 (real memory space) R40 corresponds to logical address (virtual memory space) V40 larger than real memory space R40, and at this time the real memory space R40 and virtual memory space V40 correspond to each other in specified data unit (page). As a result, simultaneous access to memory 18 from plural image processing circuits 11, 12, . . . is enabled.

write address W23 and read address R24 correspond to the boundary of the portion requiring to hold data and the portion not requiring. On the virtual memory space V40, regions (raw data region, YC region, JPEG region, display region) are assigned for each image processing. In these regions, real memory space R40 is not assigned in region in which data is not written yet. After writing of data, regions V42, V43, V44, V46 from which data is not read out yet must hold data for subsequent processes, and thus real memory spaces R42, R43, R44, R46 are assigned to these regions. Portions from which written data is being read out are not required to be held, and thus real memory space is not assigned to each of those portions.

Figure 3:
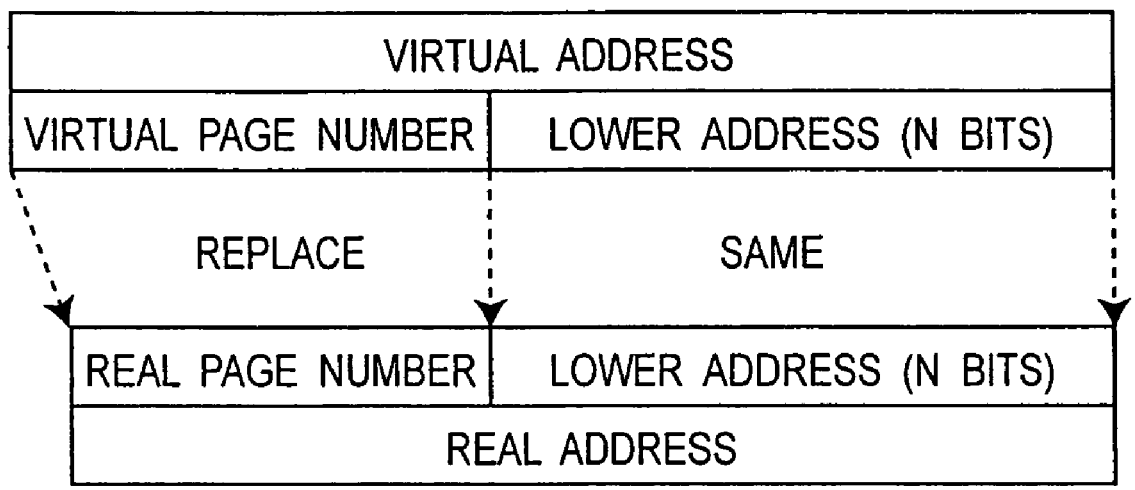
FIG. 3 is a diagram explaining correspondence between virtual address and real address.

The MMU 20 manages the virtual memory space V40 and real memory space R40 by dividing those into 64 kilobyte unit which is called "page". The real memory is assigned or released in this page unit. In the embodiment, as shown in FIG. 3, upper bits of address of virtual memory space are virtual page numbers, and upper bits of address of real memory space are real page numbers.

For example, in raw data storage region R42 of image in real memory space, when first RAW data is written, the first page of the real memory is assigned, and hereinafter every time the write address exceeds the page boundary, a new page is assigned. After reading of first one page of raw data, the real memory of this page is released, and hereinafter every time the read address exceeds the page boundary, one page is released.

Of the real memory space R40, regions not assigned in virtual memory space V40 are free region R45. The number of pages of free region R45 increases or decreases depending on assigning or releasing, and therefore the MMU 20 is always monitoring the number of pages of free region R45 as described later. That is, at any time, the MMU 20 refers to the number of pages of free region R45 in memory 18 and number of pages assigned in each data.

The imaging circuit 11 stores the raw data of taken image directly in raw data region 44 of the memory 18 assigned according to address control of the MMU 20. The YC processing circuit 12 reads out the raw data from raw data region R44 of the memory 18 under the control of MMU 20, and obtains YC data by chromatic space conversion. Consequently, the YC processing circuit 12 writes the generated YC data R43 in the region of the memory 18 specified by the MMU 20. Under the control of the MMU 20, the compression processing circuit 13 reads out the YC data R43 from the memory 18, compresses and converts it into JPEG data R42, and writes the JPEG data R42 directly into the memory 18. The recording circuit 15 reads out the JPEG data from the region R42 of the memory 18 directly on the basis of address control of the MMU 20, and finally saves the data in the recording medium 200. The display processing circuit 14 including display device reads out YC data from the data region R43 of the memory 18, and displays the data in the display device such as liquid crystal device. Accesses by these processing circuits are all governed by address control by the MMU 20, and the MMU 20 is also responsible for assigning and releasing of storage region of the memory space. On the other hand, the image processing circuits 11, 12, 13, 14, 15 exchange data directly with the memory 18.

Figure 4A:
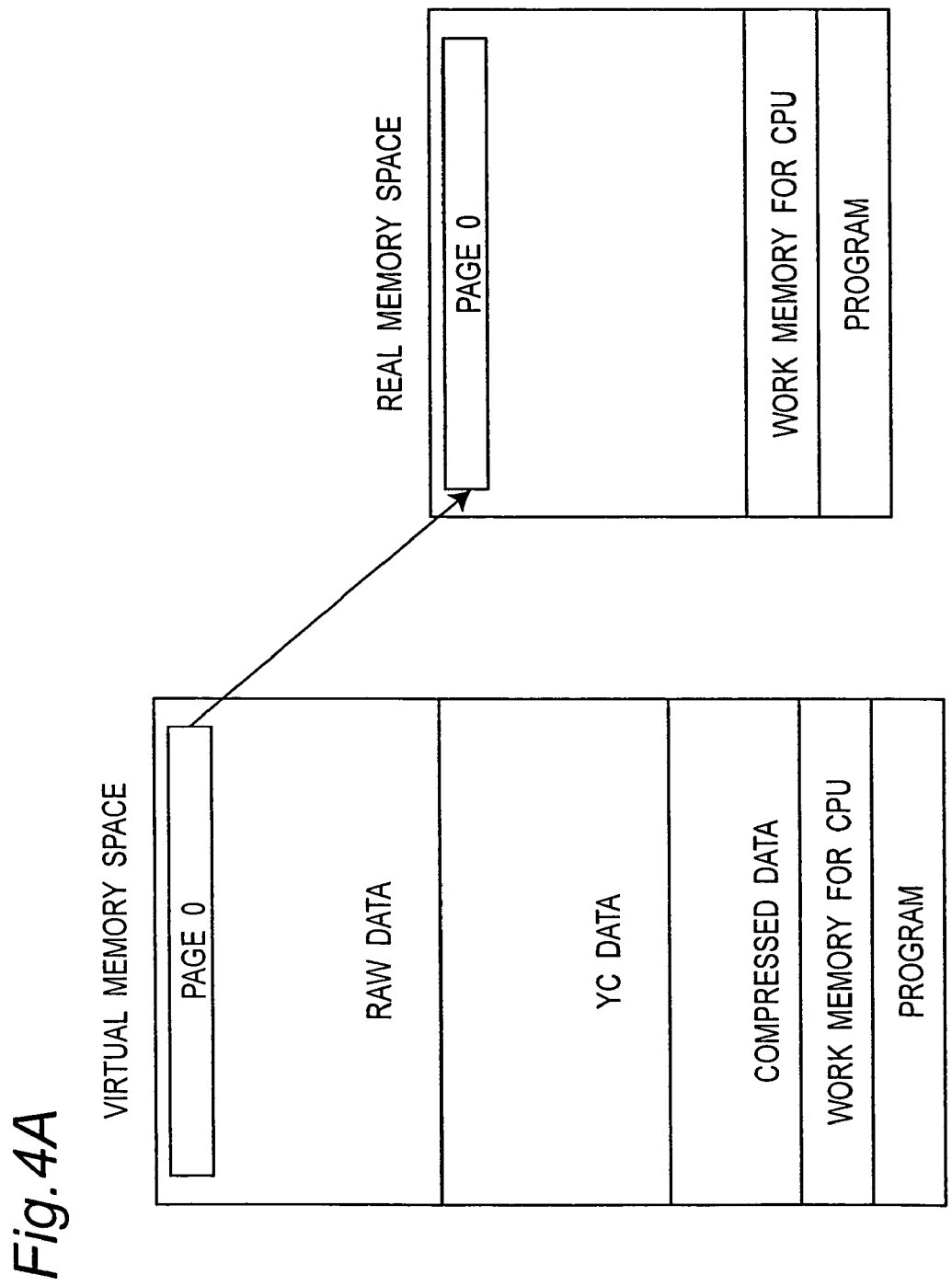
FIG. 4A is a diagram explaining correspondence between virtual page and real page in virtual memory management according to the invention.
Figure 4B:
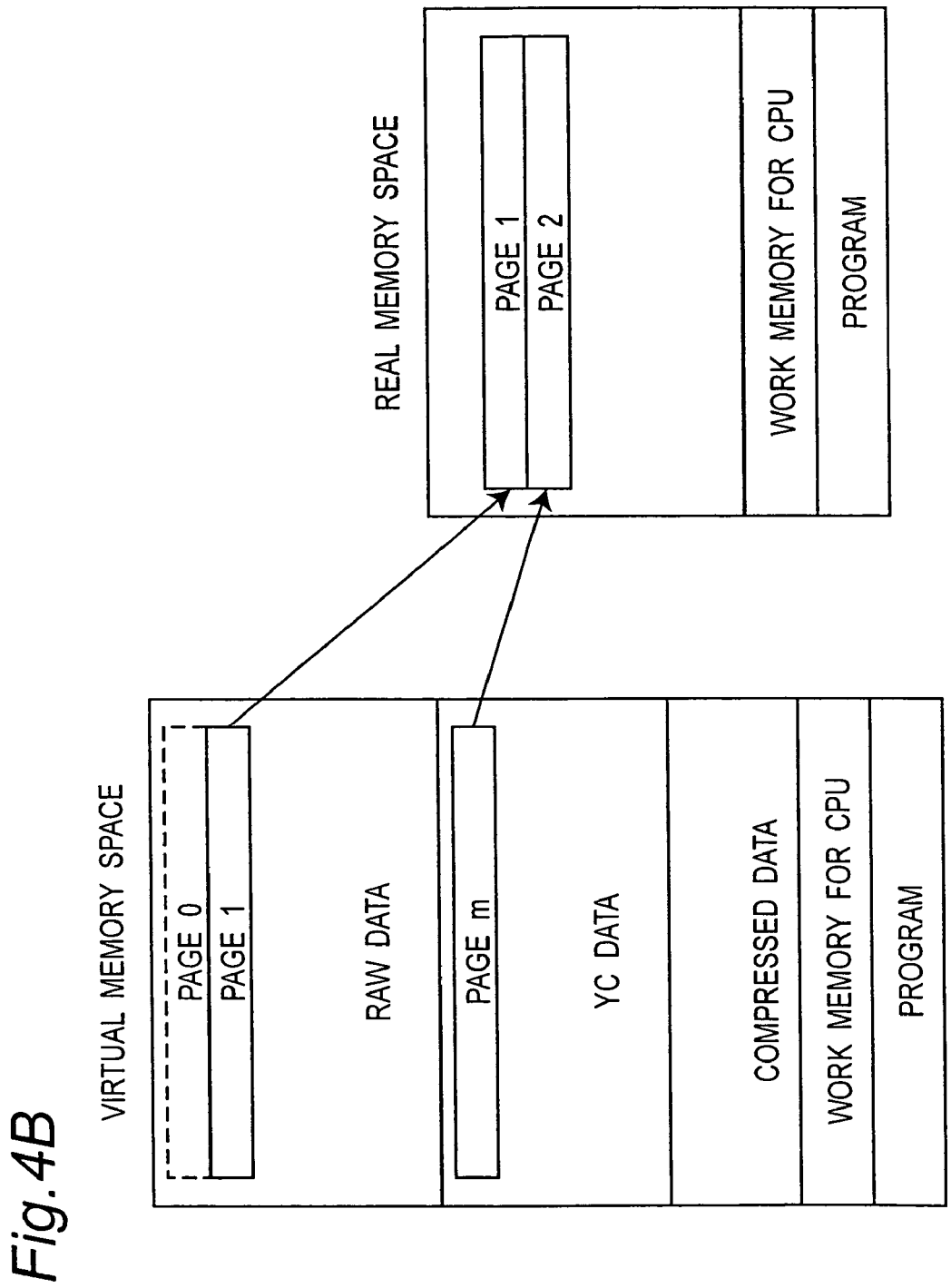
FIG. 4B is a diagram explaining correspondence between virtual page and real page in virtual memory management according to the invention.
Figure 4C:
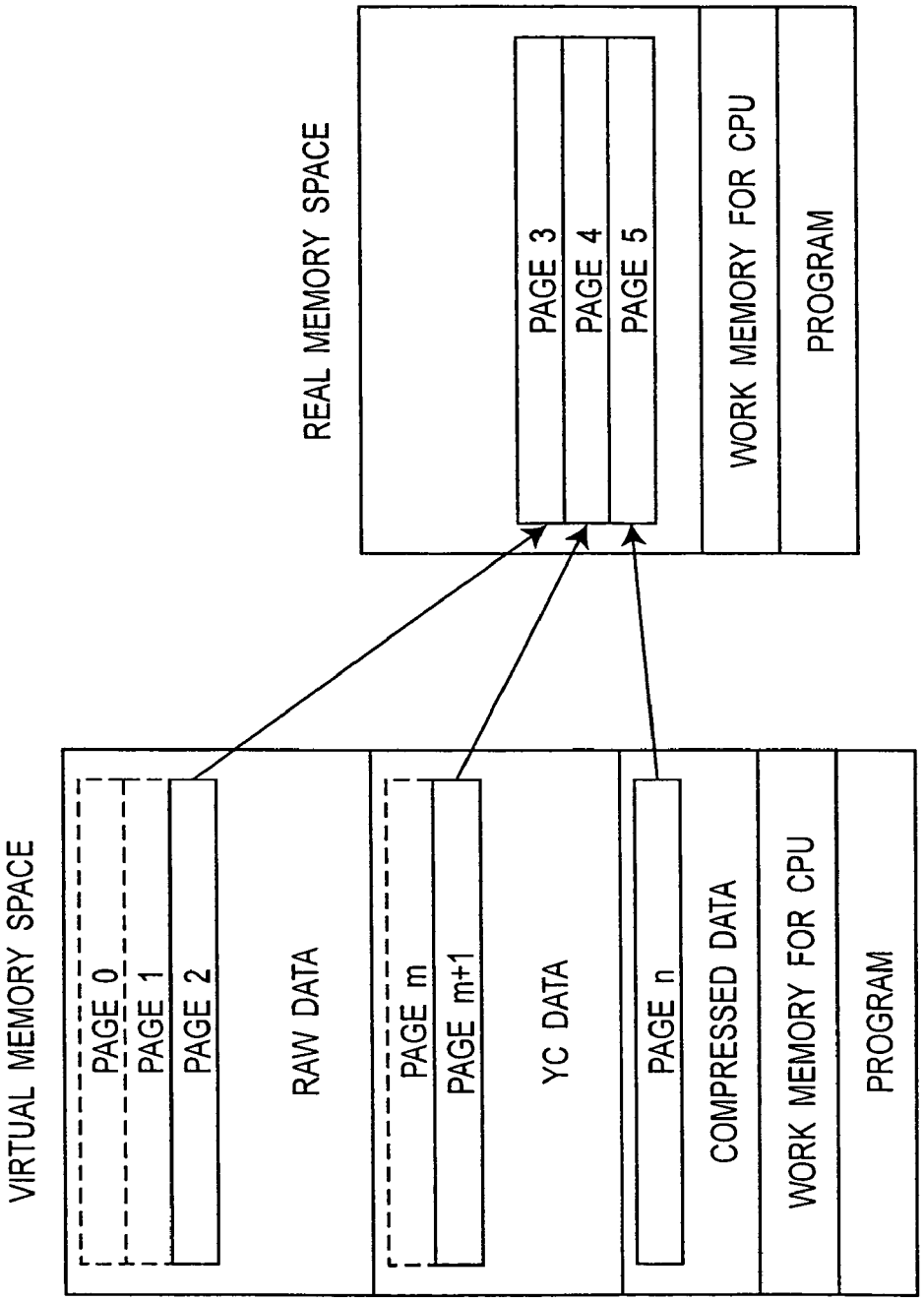
FIG. 4C is a diagram explaining correspondence between virtual page and real page in virtual memory management according to the invention.

FIG. 4A to FIG. 4C explain specific examples of region assignment in virtual memory space and real memory space by address control of MMU 20.

First, as shown in FIG. 4A, raw data taken by the imaging circuit 11 is recorded in virtual page 0 of virtual memory space. In this case, in the real memory space of the memory 18, the raw data is recorded in the region of real page 0 assigned by the MMU 20.

In succession, as shown in FIG. 4B, next raw data is recorded in virtual page 1 by the imaging circuit 11. Actually, this data is recorded in the region of real page 1. Later, the data recorded in virtual page 0 is processed by the YC processing circuit 12, and the processed data is recorded in page m in the YC data region of virtual memory space. Actually, it is recorded in page 2 of real memory space.

Further, as shown in FIG. 4C, the imaging circuit 11 records next raw data in real page 3 corresponding to virtual page 2. By the YC processing circuit 12, the raw data recorded in virtual page 1 is processed, and the processed data is recorded in real page 4 corresponding to virtual page m+1. The data recorded in virtual page m is processed by the compression processing circuit 13, and the processed data is recorded in real page 5 corresponding to virtual page n.

In this way, in the real memory space, only the page including the data in process is related to the virtual memory space in page unit, and thereby simultaneous accesses from plural image processing circuits are enabled without increasing the region being used in the real memory space.

Figure 5A:
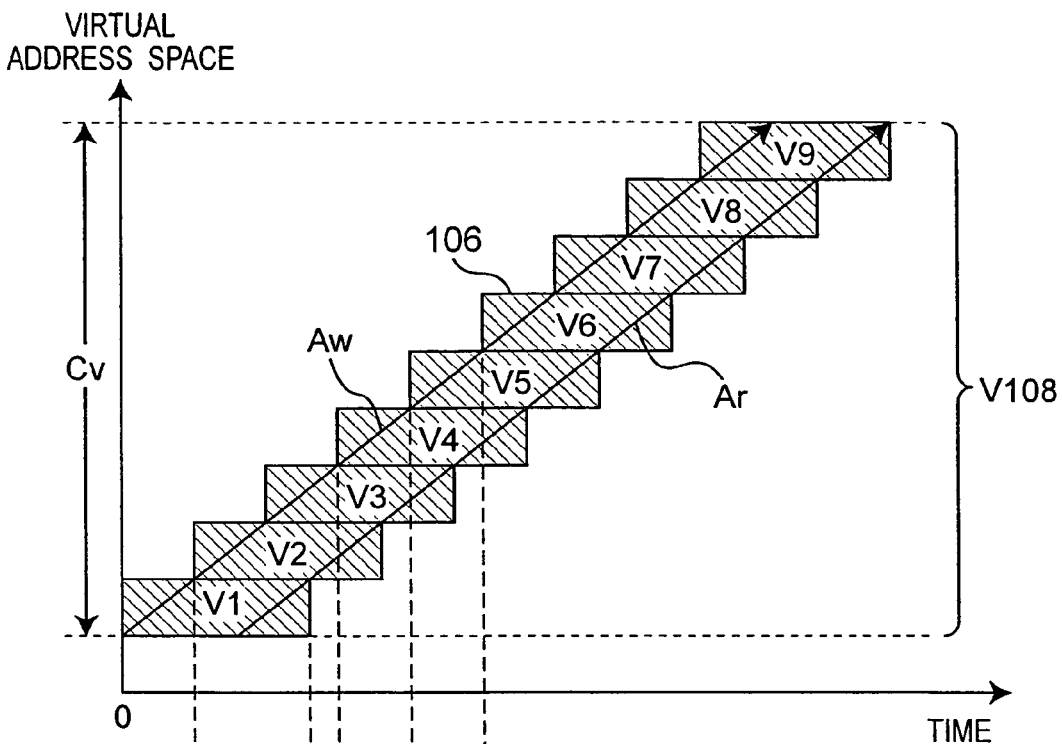
FIGS. 5A and 5B are diagrams explaining assigning and releasing by units of pages in virtual address space and real address space.
Figure 5B:
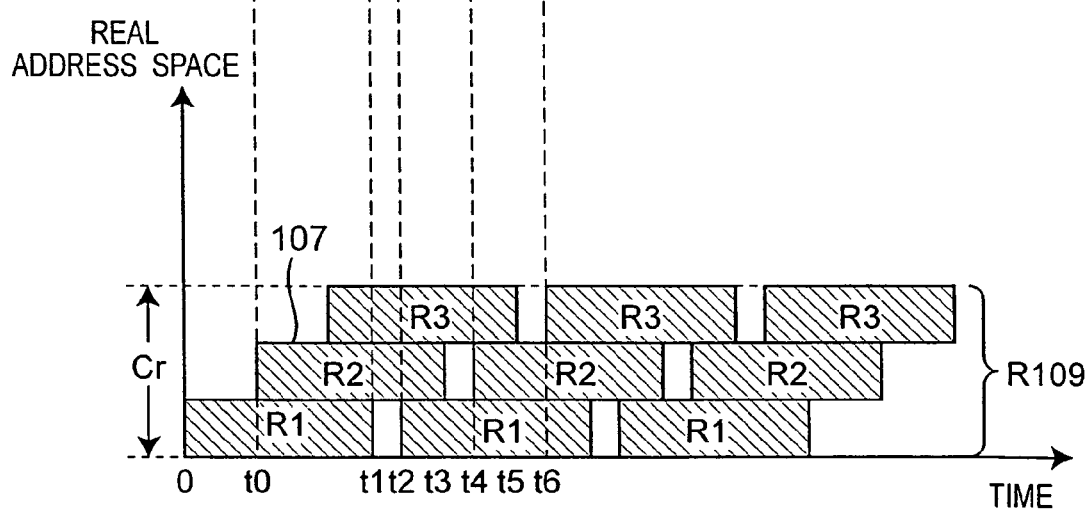

FIGS. 5A and 5B explain assigning and releasing memory in page unit. In FIG. 5A, the axis of abscissas denotes the time, and the axis of ordinates represents the virtual address. Virtual pages V1 to V9 to be stored sequentially are shown in the time sequence, and the total of memory occupation on the virtual memory space corresponding to them is Cv. FIG. 5A shows Aw which is a track of writing virtual address, Ar which is track of reading virtual address, and valid term 106 of virtual page. In FIG. 5B, the axis of abscissas denotes the time, and the axis of ordinates represents the real address. Real pages R1, R2, and R3 are used sequentially and repeatedly, showing the mode of becoming valid intermittently during the valid term 107 of real page. The memory occupation on the real memory space is Cr.

Referring now to FIGS. 5A and 5B, the assigning and releasing operation of page in the memory 18 is explained. When writing of data into the memory 18 is started at time 0, real page R1 is assigned to the virtual address of first virtual page V1 of the virtual memory space. That is, the pages to be written at this time are virtual page V1 on virtual address space and real page R1 on real address space. When the write address comes to the boundary to next page (time t0), second real page R2 is related to virtual page V2. Hereinafter, every time the write address reaches the boundary to the next page, a real page is related to a virtual page.

In the example in FIGS. 5A and 5B, reading starts slightly after writing. Reading starts from writing start address, and progresses in parallel at same speed as writing. When read address reaches the page boundary, the data being read out is no longer necessary, and the corresponding relation between real page and virtual page is canceled, and real page is released. The released real page can be assigned newly to other virtual page. In this example, after real page R1 is released at time t1, real page R1 is assigned again to virtual page V4 at time t2. In succession, at time t3 and t5, real pages R2 and R3 are released, and they are later assigned again to virtual pages V5 and V6 at time t4 and t6, respectively.

In this manner, the real pages are used repeatedly. Therefore, when the write address and read address move in the range of virtual address V108 on the virtual space, that is, the range of memory capacity R109, the range to be read and written data on the real address space is within the range of the memory capacity R109, that is, the range of the memory capacity R109 which is much smaller than the capacity V108 on the virtual address.

1.3 Configuration of Memory Management Unit (MMU)

Figure 6:
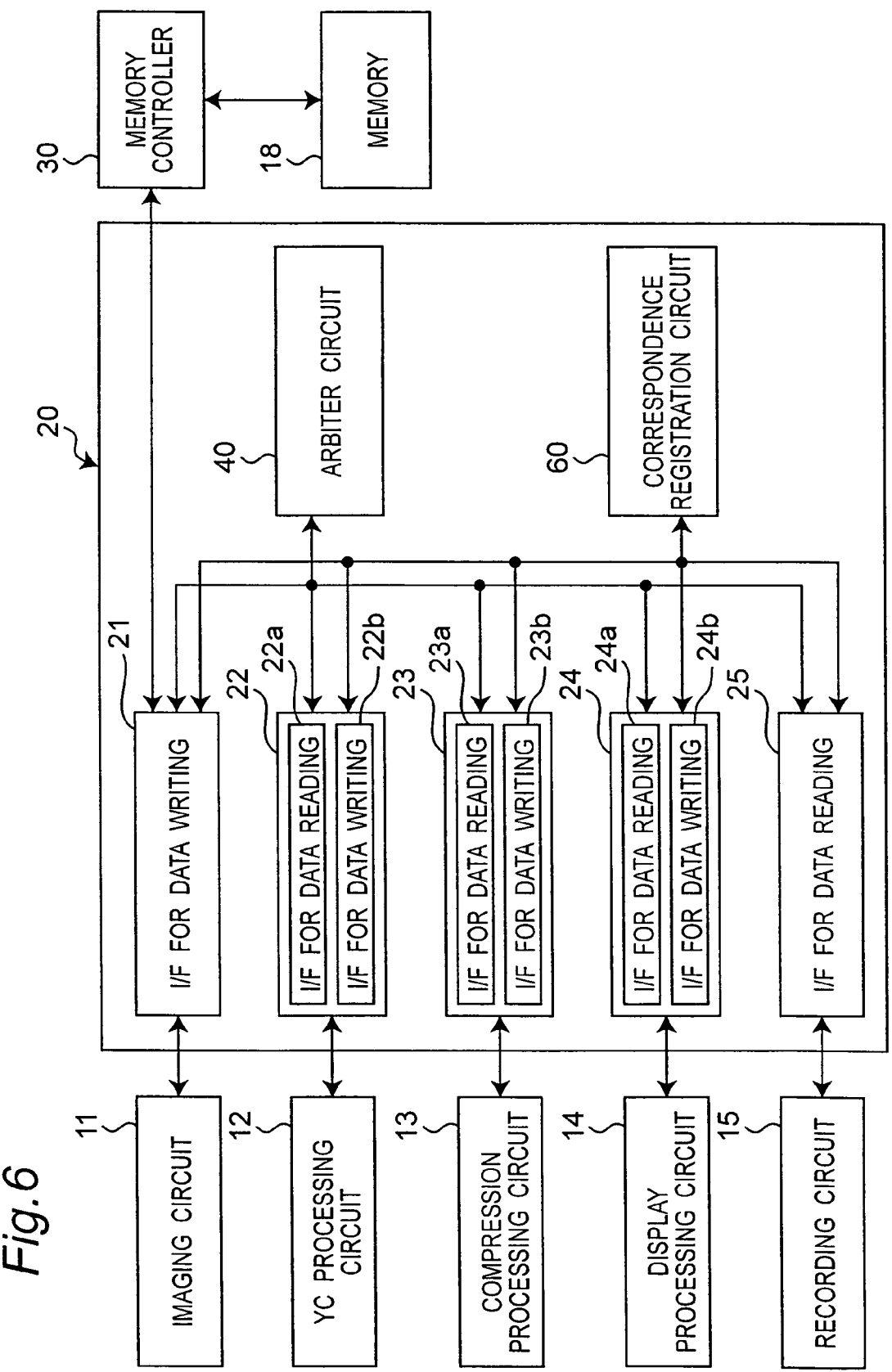
FIG. 6 is a block diagram of a memory management unit (MMU).

FIG. 6 shows a specific configuration of the MMU 20. The MMU 20 includes a plurality of interface circuits 21, 22, 23, 24, 25, an arbiter circuit 40, and a correspondence registration circuit 60. The interface circuits 21, 22, 23, 24, 25 are provided corresponding to image processing circuits 11, 12, 13, 14, 15, respectively.

Figure 7:
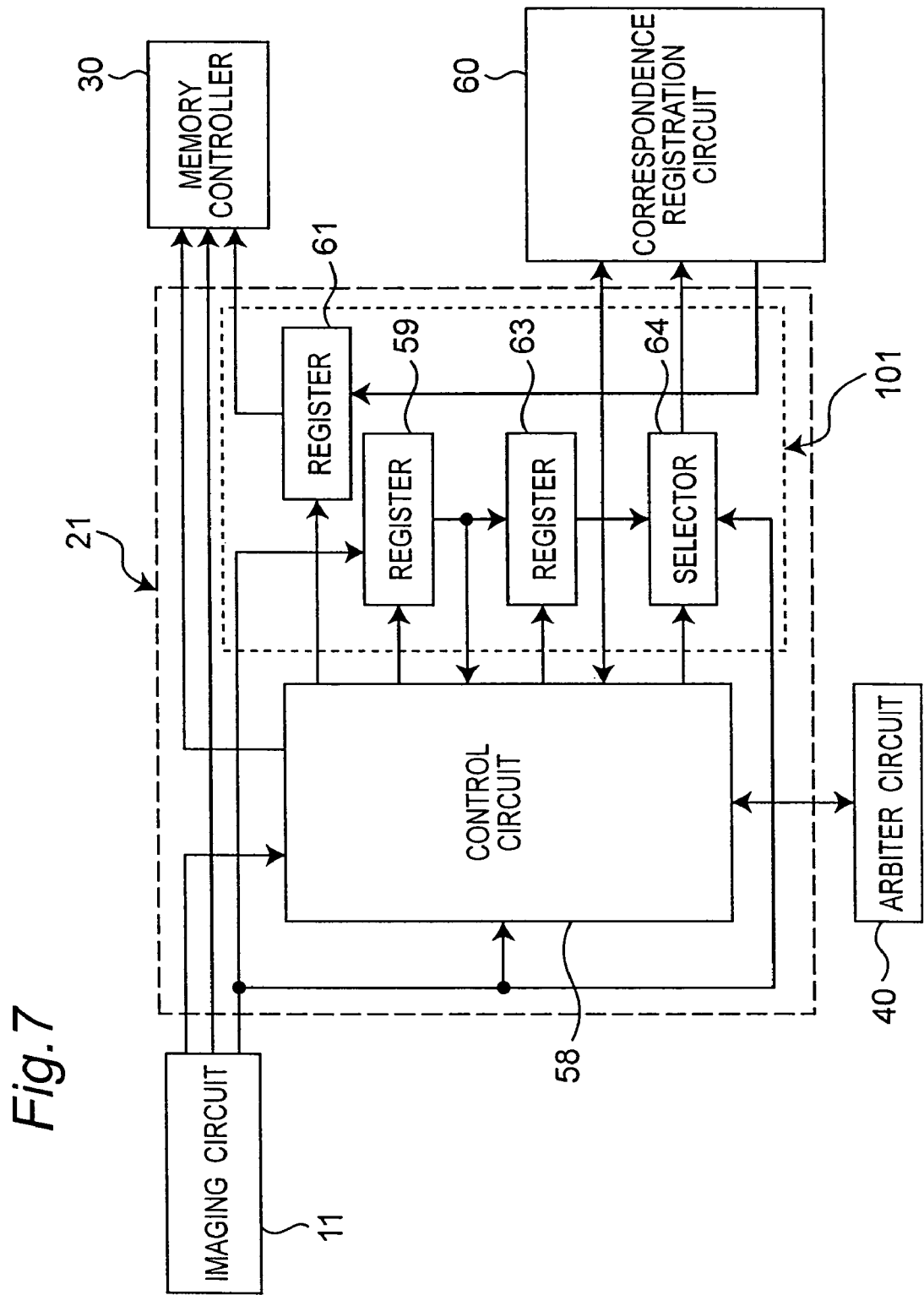
FIG. 7 is a block diagram of an interface circuit.

FIG. 7 shows a configuration of the interface circuit 21 corresponding to the imaging circuit 11. The interface circuit 21 includes an address conversion buffer 101 and a control circuit 58. The address conversion buffer 101 includes three registers 59, 61, 63, and a selector 64. The address conversion buffer 101 stores information showing correspondence between real page and virtual page, and converts the virtual address into real address according to this correspondence. The control circuit 58 exchanges information with the arbiter circuit 40, and controls the operation of the address conversion buffer 101 so as to adjust the access right to the memory 18.

The interface circuit 25 corresponding to the recording circuit 15 is also composed same as the configuration in FIG. 7. However, while the recording circuit 15 only reads the memory 18, the imaging circuit 11 only writes data to the memory 18. Thereby the interface circuit 21 corresponding to the imaging circuit 11 and the interface circuit 25 corresponding to the recording circuit 15 are similar in configuration, but slightly different in operation.

The YC processing circuit 12, compression processing circuit 13, and display processing circuit 14 operate to both read and write the memory 18. Accordingly, the interface circuits 22 to 24 corresponding to the YC processing circuit 12, compression processing circuit 13, and display processing circuit 14 include interface circuits 22a to 24a operating for reading data from the memory 18, and interface circuits 22b to 24b operating for writing data to the memory 18, as shown in FIG. 6.

Usually, when the compression processing circuit 13 compresses an image in JPEG format, a header of the image is processed by the compression circuit 13. However, the compression circuit 13 may not always have a function of processing the header. In such a case, another interface circuit (not shown) may be provided for CPU 10, and the interface circuit may perform a process to add a header so that the CPU 10 can access the memory 18. If an improper header is attached to a compressed image of the compression circuit 13, similarly, another interface circuit (not shown) may be provided for CPU 10. The interface circuit may perform a process to exchange the header so that the CPU 10 can access the memory 18.

The correspondence registration circuit 60 stores correspondence information managing the corresponding relation between all real pages and virtual pages in the accessed memory 18. That is, as shown in FIG. 8, the correspondence registration circuit 60 includes a correspondence table 73, a valid bit table 74, a free page table 75, and a loadable counter 83, as correspondence information between real pages and virtual pages. The correspondence registration circuit 60 also has a selector 70 and a control circuit 71.

The control circuit 71 includes an up/down counter 77. The up/down counter 77 manages the number of free pages in real memory space. The up/down counter 77 decreases the count by 1 when the control circuit 71 returns "success code" in response to "correspondence registration request code" which requests to relate real page to virtual page, or increases the count by 1 when the control circuit 71 returns "success code" in response to "correspondence deletion request code" which requests to cancel the correspondence between real page and virtual page. The up/down counter 77 does not change the count when the control circuit 71 returns "failure code" in response to "correspondence registration request code." In this manner, the up/down counter 77 varies sequentially with increase or decrease of number of free pages in real memory space. Hence, reference to the value of the up/down counter 77 allows state of the free pages to be known.

The correspondence table 73 stores the correspondence between virtual page numbers and real page numbers as shown in FIG. 9A. The correspondence table 73 sends the real page number corresponding to the selected virtual page number to an intended interface circuit.

The valid bit table 74 stores information showing presence or absence of real page corresponding to each virtual page, in each virtual page, as shown in FIG. 9B. The valid bit table 74 includes a plurality of valid bits provided corresponding to virtual pages, and feeds the value of the valid bit into the control circuit 71. When the valid bit is "1," it shows that the virtual page corresponding to this bit does not have corresponding real page.

The free page table 75 stores information about presence or absence of virtual page corresponding to each real page, in each real page, as shown in FIG. 9C. In other words, the free page table 75 stores information showing whether each real page is free or not. The free page table 75 is composed of bit rows of which address is the real page number. When the bit value is "1," it means that the corresponding real page is free. When the bit value is "0," it means that the corresponding real page is being used, that is, valid data is stored in this page. The free page table 75 is composed of RAM having data lines of 32-bit width. One bit corresponds to one page, and the free page table 75 allows presence or absence of virtual pages corresponding to 32 pages of real pages to be referred at once.

The loadable counter 82 provides read address to the free page table 75. The value of the loadable counter 82 is the upper bits of free page number. More specifically, the control circuit 71 provides the free page table 75 with the value indicated by the loadable counter 82 as an address, reads out the data of the free page table 75 in every 32 bits, and obtains the lower bits of the free page number from positions of bits of which values are "1" in 32 bits. The loadable counter 82 operates to either "load" or "increment" according to the instruction from the control circuit 71. In the case of increment, at every count-up, free page information for 32 pages is obtained, so that the free page number can be obtained at high speed. The control circuit 71, when finding a free page, stops the increment of the loadable counter 82 and holds the free page number.

The selector 70 selects one input accompanied by a valid request code out of inputs from the plurality of interface circuits 21 to 25. The virtual page number included in the selected input is entered as an address into the correspondence table 73 and valid bit table 74. The interface circuits 21 to 25, before accessing the correspondence registration circuit 60, requests access right to the arbiter circuit 40.

The arbiter circuit 40 arbitrates when accesses are requested simultaneously from plural image processing circuits 11 to 15, and provides, at a time, only one of the interface circuits 21 to 25 with an access right to the correspondence registration circuit 60. For example, the interface circuit 21 receiving the access right accesses the registration registering circuit 60 to acquire the corresponding information between real page and virtual page. Very rarely, plural access requests occur simultaneously, and thus it is preferred to provide a higher priority rank to an interface circuit of image processing circuit requiring a particularly real time performance such as imaging circuit 11. As a result, the imaging circuit 11 has the shortest waiting time for access right, and the user rarely misses the shooting chance, realizing real time processing. Thus, plural image processing circuits 11 to 15 can access the virtual memory space individually, so that image data is transmitted directly between the memory. 18 and plural image processing circuits 11 to 15.

The interface circuits 21 to 25 request correspondence between real pages and virtual pages, and the correspondence registration circuit 60 immediately registers the correspondence, and therefore there is no need of intervention of CPU 10, and hence the registering operation of correspondence between real pages and virtual pages does not become bottleneck for processing speed. The invention can provide such merit. In other words, use of the memory management unit (MMU) 20 allowing plural image processing circuits 11 to 15 to access the virtual memory space can disperse the load of address conversion in access processing to the virtual memory space, among interface circuits 21 to 25 corresponding to image processing circuits 11 to 15. As a result, there is a merit that the address conversion from virtual page to real page does not become bottleneck for processing speed.

At least one of the interface circuits 21 to 25, for example, the interface circuit 21 has a function of storing the number of the virtual page once accessed by the imaging circuit 11 including the CCD, and a function of comparing this stored number of virtual page with the number of virtual page to which access is requested from the imaging circuit 11. On the basis of the comparison result, the interface circuit 21 registers the correspondence between real pages and virtual pages by accessing the correspondence registration circuit 60 only when the real page corresponding to the virtual page to be accessed is not stored. As a result, the correspondence registering process of the correspondence registration circuit 60 occurs only when the address exceeds the border of page, and hence registration process of correspondence between real pages and virtual pages does not become bottleneck for processing speed.

In this imaging apparatus, at least one of the interface circuits 21 to 25 has a function of accessing the correspondence registration circuit 60 according to the arbitration result by the arbiter circuit 40, for the real page to which access has been completed, and canceling the correspondence between real pages and virtual pages accessed before by the corresponding image processing circuit among the image processing circuits 11 to 15. Accordingly, the real page to which access has been completed is immediately released by the corresponding one of the interface circuits 21 to 25, and the real page is not restrained for an unnecessary period, which is also another merit.

Further, the control circuit 71 of the correspondence registration circuit 60 accesses the free page table 75 to search for a real page not having the corresponding virtual page. In this case, by integrating the control circuit 71 with the correspondence table 73, there is a merit that whole of circuits for page search are reduced in size, and the search speed is enhanced.

While there is no access from the interface circuits 21 to 25, the control circuit 71 of the correspondence registration circuit 60 accesses the free page table 75 to search for a real page not having the corresponding virtual page, and holds the number of the seared real page as a free page number to be ready for the next relating. The period not having access from interface circuits 21 to 25 is used for searching for and preparing the real page not having the corresponding virtual page, prior to request from the interface circuits 21 to 25. Thus, when the relating is requested from the interface circuits 21 to 25, the real page number can be immediately presented in response, and when registering the correspondence between real pages and virtual pages waiting time of the interface circuits 21 to 25 for processing can be substantially shortened.

2. Operation of Imaging Apparatus

First, the role of the arbiter circuit 40 is explained. The interface circuits 21 to 25 convert addresses individually, and access the correspondence registration circuit 60 according to the result. Since the image processing circuits 11 to 15 operate individually, plural accesses to the correspondence registration circuit 60 may occur simultaneously. On such occasion, the arbiter circuit 40 arbitrates plural simultaneous access requests, and executes access one by one.

For example, when two accesses are requested simultaneously from the image processing circuits 11 and 12, arbitration request is conveyed from the interface circuits 21, 22 to the arbiter circuit 40. Although the arbiter circuit 40 has several methods of control of priority, in this embodiment, fixed priority set beforehand to each interface circuit is used. It is controlled so that the access right is provided to one having the highest priority of the interface circuits 21 and 22.

The arbiter circuit 40 notifies the interface circuits 21 and 22 that the access right is provided to the interface circuit 21, as a result of the arbitration. As a result, only the interface circuit 21 can have the access right and access the correspondence registration circuit 60.

In this case, the highest priority is provided to the imaging circuit 11, and the arbiter circuit 40 provides the access right by priority without delay even if there is no real page corresponding to the accessed virtual page. When obtaining the access right, the control circuit 58 outputs the correspondence register request code, together with virtual page number, to the correspondence registration circuit 60. The correspondence registration circuit 60 relates a real page not having the relation to the requested virtual page, according to the correspondence register request code.

2.1 Data Write Operation to Memory

Figure 10:
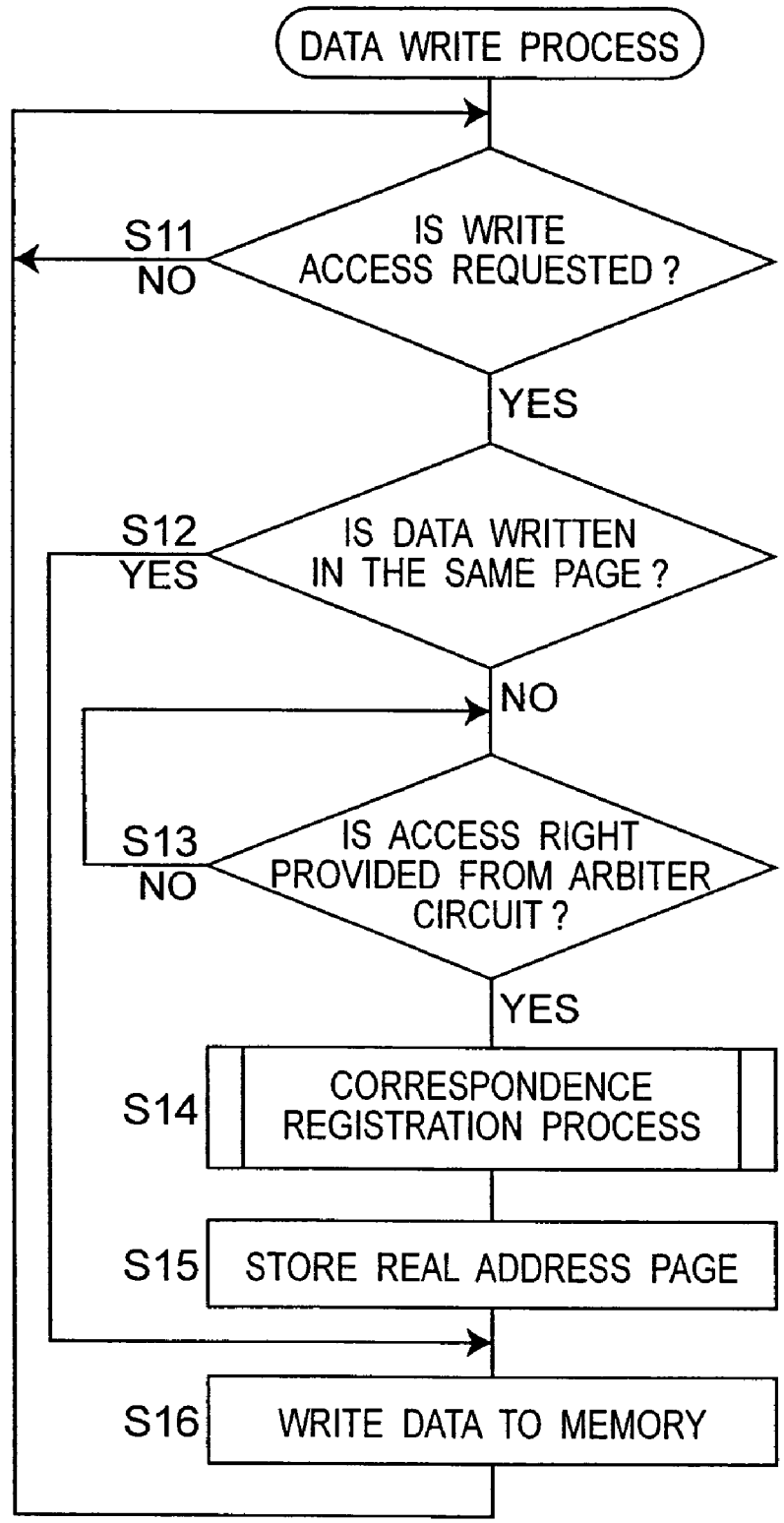
FIG. 10 is a flowchart of data writing process.

Referring to FIG. 10, operation of data writing of the MMU 20 into the memory 18 is described. Herein, it is supposed that data writing is requested from the imaging circuit 11 as image processing circuit.

When write access is requested from the imaging circuit 11 (S11), the upper bits of the address, or page, specified together with write access request is judged to be same as the page of the previous process or not (S12). More specifically, the control circuit 58 of the interface circuit 21 monitors the address valid signal of virtual address issued by the imaging circuit 11 on the control line. If the address is valid, the control circuit .58 compares the upper bits of the virtual address with the virtual page number stored in the register 59. The register 59 stores the upper bits of the virtual address in the immediately preceding access as virtual page number, under the control of the control circuit 58. Therefore, when comparison results are matched, it means that the upper bits of the virtual address is same as those in the previous access.

When the presently specified page number is same as the previous page number, data is written into the memory 18 by using the page number of the previous real page (S16). That is, since the register 61 stores the real page number in the previous access by the control of the control circuit 58, this real page number is output to the memory 18 as the upper bits of the real address. In other words, when comparison results are matched, immediately, the valid signal of the real address is sent to the memory 18. As a result, the memory 18 can access on the basis of the valid signal of real address.

On the other hand, if the comparison results are not matched, that is, if the upper bits of the virtual address are different from those of the previous access (No at S12), it is necessary to acquire new real page number corresponding to the specified virtual page number. Therefore, the interface circuit 21 must access the correspondence registration circuit 60.

The control circuit 58 first request the arbiter circuit 40 to have access right to the interface circuit 21, and waits until the access right is given (S13). When the access right is given from the arbiter circuit 40 (Yes at S13), correspondence registration process is done so that the real page corresponding to the specified virtual page is requested to the correspondence registration circuit 60 (S14). The detail of the correspondence registration process (S14) is described later.

When the real page number corresponding to the virtual page is obtained from the correspondence registration circuit 60, the control circuit 58 stores this real page number in the register 61 (S15). At the same time, the control circuit 58 stores the upper bits (page) of virtual address in the register 59. As a result, the upper bits of virtual address and output of register 59 coincide, and at this moment, the correspondence registration circuit 60 outputs the valid signal of real address to the memory 18 by way of the memory controller 30. The memory 18 writes in the data issued from the imaging circuit 11 according to the control of the memory controller 30 (S16).

Figure 11:
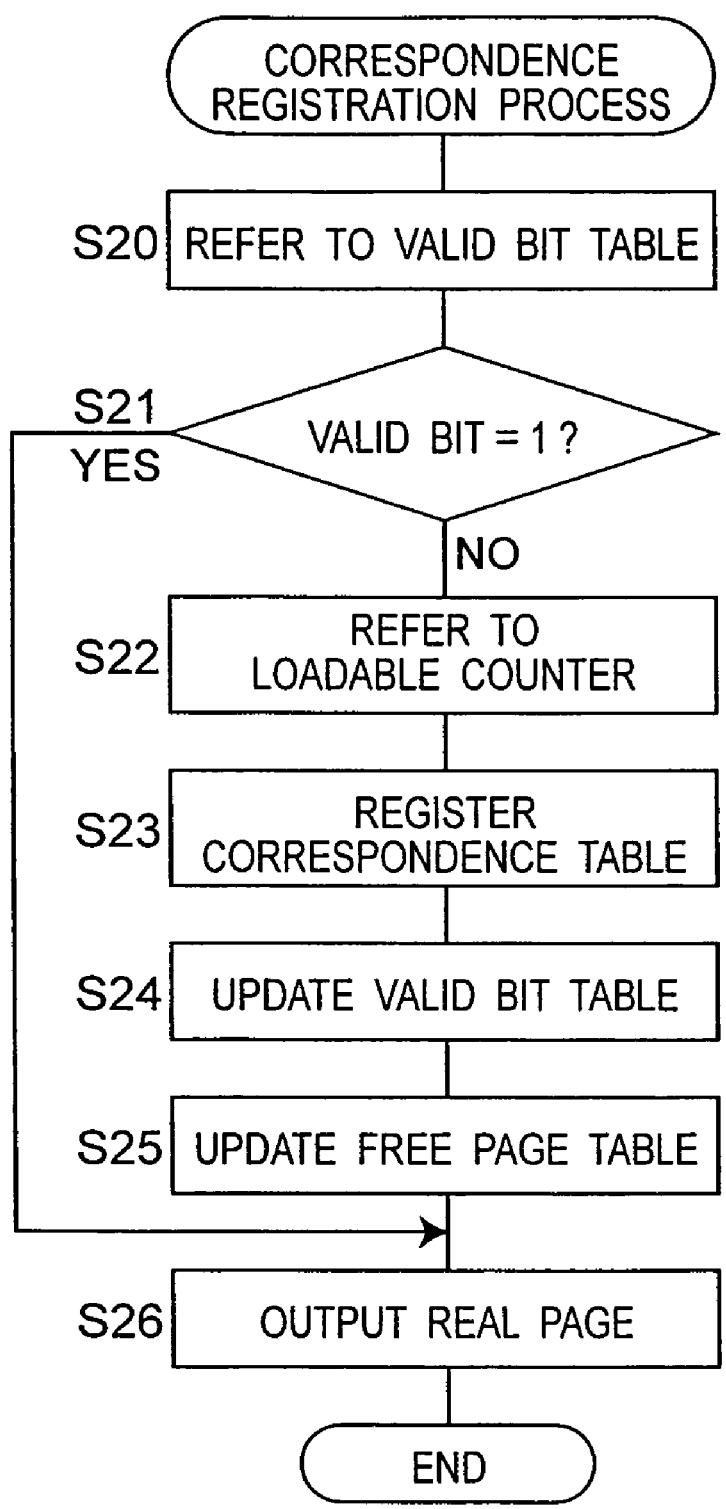
FIG. 11 is a flowchart of correspondence registering process.

Referring to FIG. 11, detail of correspondence registration process (S14) in FIG. 10 is explained. In the correspondence registration process, the control circuit 58 controls the selector 64 to send the upper bits of virtual address, as virtual page number, to the correspondence registration circuit 60 and send simultaneously "correspondence register request code" to the correspondence registration circuit 60.

Upon receipt of the "correspondence register request code" from the interface circuit 21, the control circuit 71 of the correspondence registration circuit 60 first refers to the valid bit table 74 (S20), and judges whether there is real address corresponding to the virtual address intended to write in. That is, if the valid bit is "1" (corresponding real page presents), "success code" is sent as response code to the interface circuit 21 which has transmitted the correspondence reference request code. The response code is sent only to one interface circuit issuing valid request code among interface circuits 21 to 25 by way of the selector 70. The real page number is sent from the correspondence table 73 to all interface circuits 21 to 25. As mentioned above, only one of the interface circuits receives the success code.

At the same time, when the valid bit is "1" (Yes at S21), the real page number is sent from the correspondence table 73 (S26).

On the other hand, if the valid bit is "0" (No at S21), the correspondence registration circuit 60 executes a new relating of virtual address to real address (S22 to S25).

That is, when the valid bit is "0" (No at S21), the control circuit 71 of the correspondence registration circuit 60 sends the free page number obtained from the value of loadable counter 82 and output of free page table 75, as real page number (S22). Specifically, the control circuit 71 gives the value read from the loadable counter 82 to the free page table 75, as an address, and reads 32-bit data from the free page table 75, and judges presence or absence of bit of which value is "1" in this bit row. When bits of value "1" are included, the bit position of the lowest bit of bits of value "1" is set as lower 5 bits and the address given to the free page table 75 is set as upper bits, and using those bits, free real page number is determined. The determined real page number is related to the virtual page, and registered to the correspondence table 73 (S23).

At the same time, the control circuit 71 writes "1" in the bit at the position corresponding to the specified virtual page on the valid bit table 74 (S24). Further, the control circuit 71 sets at "0" the lowest bit of bits of value "1" in the 32-bit data read from the free page table 75, and rewrites it at the same address on the free page table 75 (S25). As a result, in the real memory space, one free page is decreased. Simultaneously, the correspondence table 73 sends the real page number to the interface circuits 21 to 25 (S26). At the same time, the control circuit 71 sends the "success code" to only one interface circuit issuing valid request code among the interface circuits 21 to 25. As mentioned above, only one of the interface circuits receives the success code.

At this time, the loadable counter 82 is incremented when all of 32-bit data read from the free page table 75 are "0", and reads next 32-bit data from the free page table 75, and performs the operation as mentioned above if bit of "1" is included in the 32-bit data read. If bit of "1" is not included in the 32-bit data read, the loadable counter 82 is incremented repeatedly to the limit of the number of times of one circulation. If no bit of "1" is found in one circulation of the loadable counter 82, at this moment, the control circuit 71 sends a failure code only to one interface circuit issuing a valid request code among the interface circuits 21 to 25.

2.2 Data Read Operation from Memory

Figure 12:
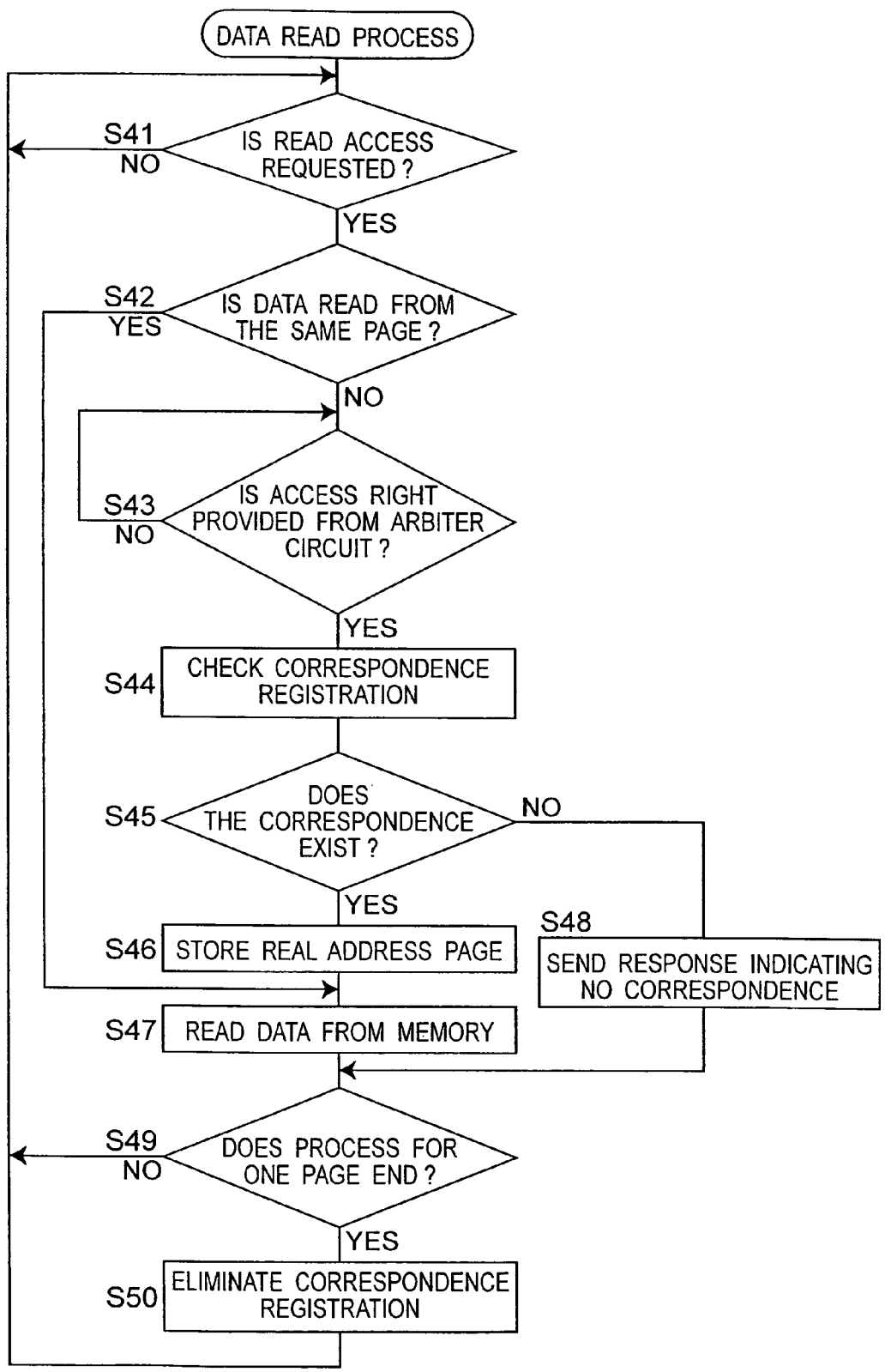
FIG. 12 is a flowchart of data reading process.

Referring to FIG. 12, data read process is explained. Herein, it is supposed that data reading is requested from the recording circuit 15 as image processing circuit.

When the recording circuit 15 requests read access (S41), the upper bits (page) of the address specified together with the read access request is judged to be same as the page of previous process or not (S42). When the presently specified page is same as the page of the previous access, data is read from the memory 18 by using the previous real page (S47).

When the presently specified page is different from the page of the previous access (No at S42), access right is requested to the arbiter circuit 40, and when access right is given from the arbiter circuit 40 (Yes at S43), it is inquired to the correspondence registration circuit 60 whether or not there is a real page corresponding to the specified virtual page (S44). Accordingly, the control circuit 58 sends a correspondence reference request code to the correspondence registration circuit 60.

The correspondence registration circuit 60 replies that there is no correspondence if real page corresponding to virtual page is not available (S48). That is, failure code is transmitted as response. If there is a corresponding real page, this real page is stored in the register 61 (S46). At the same time, the value of the register 59 is moved and saved in the register 63. The register 63 is referred to when erasing the corresponding relation of the virtual page no longer necessary after processing of data and the real page. Later, the upper bits of virtual address (page) are stored in the register 59. Using the value of the register 61, the data is read from the memory 18 (S47).

Judging if reading of one page is over or not (S49), if over, correspondence registration about the page is canceled on the correspondence table 73 (S50). This is because it is no longer necessary to access the virtual page already being read out. Hence, the interface circuit 25 immediately releases the real page to which access has been completed that corresponds to the real address accessed just before. The register 63 has stored the virtual page number used in the previous access, and the control circuit 58, after saving of real page number, immediately changes over the selector 64 to the output of the register 63 to send the previous virtual page number to the correspondence registration circuit 60. At the same time, the control circuit 58 sends "correspondence delete request code" to the correspondence registration circuit 60. The correspondence registration circuit 60 cancels the correspondence about the virtual page number, in response to the correspondence delete request code.

The detail of operation of the correspondence registration circuit 60 when receiving the "correspondence delete request code" is explained.

When the correspondence registration circuit 60 receives the "correspondence delete request code," the control circuit 71 writes "0" in a bit corresponding to the page requested to be deleted on the valid bit table 74. At the same time, the correspondence table 73 loads the real page number into the loadable counter 82.

As mentioned above, from the free page table 75, presence or absence of corresponding virtual pages can be referred to at once in 32 pages of real pages.

Consequently, the control circuit 71 refers to the free page table 75 next to the valid bit table 74. The free page table 75 is composed of RAM of 32-bit width, and one bit corresponds to one page. When each bit value is "0," it means that the real page and virtual page "correspond to each other." The address bit position of the address line 83 corresponds to real address. In response to "correspondence delete request code," the control circuit 71 reads 32-bit data from the free page table 75, sets at "1" the value of the bit at the position indicated by the lower 5 bits of the real page number to be erased in the 32-bit read data, and writes the data again at the same address on the free page table 75. As a result, the real page corresponding to the specified virtual page becomes free, and registration is cancelled, and hence the control circuit 71 sends the success code to the interface circuit which has transmitted the correspondence delete request code.

While not receiving valid request code from the interface circuit, the control circuit 71 always repeat operations to read the 32-bit data from the free page table 75 and to increment the loadable counter 82 if all 32 bits are "0" (if there is no virtual page corresponding to the real page). As a result, if there is a bit of value "1" (that is, if there is real page not having corresponding virtual page), the loadable counter 82 stops to specify the higher address of the free page number. At this time, the position of bit of value "1" indicates the lower address of the free page number. Thus, since the information about free page is preliminarily held, the real address can be specified without delay whenever needed. In this configuration, free pages are not searched page by page, but free pages can be searched in batch of 32 pages, and the searching is finished in a short time.

In this configuration and operation, the correspondence registration circuit 60 can finish the operation always in a specified time to the request for reference or deletion of correspondence. Further when requesting registration, operation can be finished within a specified time as far as there is free page. Therefore, the MMU 20 of the imaging apparatus of the invention can be applied in extreme real-time processing not allowing delay as in taking of data from the imaging apparatus. Hence the used real pages are immediately released without delay by the function of interface circuits, so that the memory 18 can be utilized efficiently.

2.3 Imaging Permission Operation

Operation for permitting of Imaging in the imaging apparatus is described. Prior to explanation of the operation, changes of memory capacity on the real memory space of the memory 18 are explained.

Figure 13:
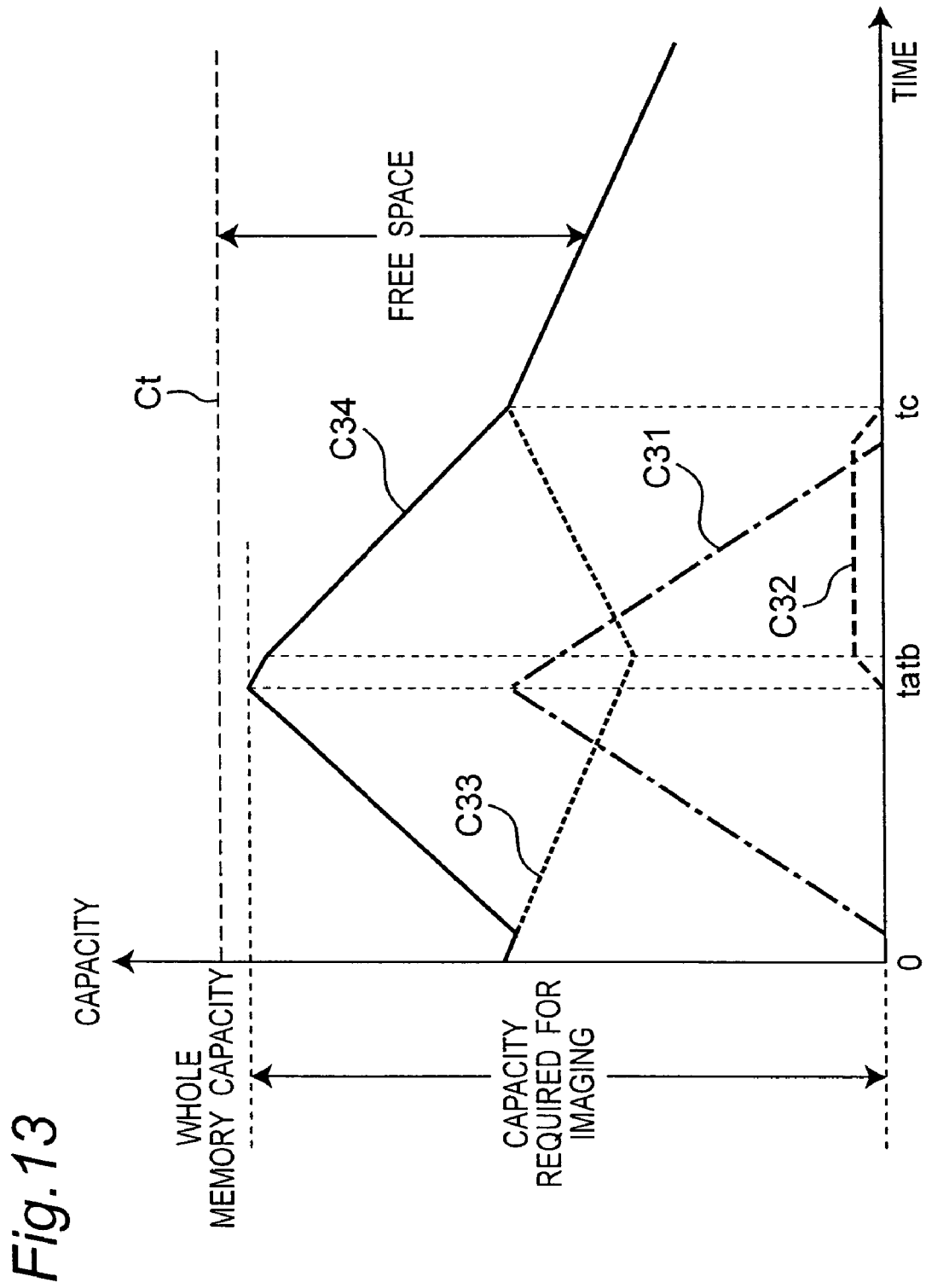
FIG. 13 is a diagram of temporal change of storage capacity of memory.

FIG. 13 is a diagram showing time-course changes of capacity occupied by the memory on the real memory space when imaging data. The axis of abscissas denotes the time and the axis of ordinates represents the capacity. In the diagram, the curve C31 is the memory occupation by raw data, the curve C32 is the memory occupation by YC data, the curve C33 is the memory occupation by JPEG data, and the curve C34 is the total memory occupation. In this diagram, the remainder by subtracting the total memory occupation C34 from the whole storage capacity of the memory 18, that is, the capacity by subtracting the value of curve C34 from the value of broken line Ct indicates the free capacity.

When the imaging circuit 11 starts outputting raw data to the raw data region R42, the memory occupation C31 begins to increase.

The YC processing circuit 12 starts processing slightly after start of raw data output to the raw data region R44 by the imaging circuit 11. The speed of the YC processing circuit 12 for processing the raw data is same as the output speed of raw data by the imaging circuit 11. The page assigned in the raw data is released when it is completely processed. Accordingly, when the raw data is sent to the raw data region R44 by a constant amount from the imaging circuit 11, the memory occupation C31 of raw data on the raw data region R44 in the real memory space becomes constant after start of processing by the YC processing circuit 12. In FIG. 13, however, for the convenience of explanation, there is no continuous supply of data into the raw data region R44 from the imaging circuit 11 after start of processing by the YC processing circuit 12, and hence the memory occupation C31 on the raw data region R44 is decreasing after the YC processing circuit 12 starts processing at time ta.

The compression processing circuit 13 starts conversion somewhat later (at time tb) after the YC processing circuit 12 starts output of YC data in the YC data region R43. The conversion speed of the compression processing circuit 13 is same as the processing speed of the YC processing circuit 12, and hence the memory occupation C32 of YC data on the YC data region R43 in the real memory space becomes constant after start of conversion by the compression processing circuit 13.

The recording circuit 15 starts transfer slightly after the compression processing circuit 13 starts output of JPEG data to the JPEG data region R42. However, since the transfer speed to the recording medium is slow, the data cannot be transferred at the same speed as generation speed of JPEG data. Therefore, the speed of releasing the page assigned in the JPEG data is not so high as the speed of assigning page in the JPEG data. Accordingly, during operation of the compression processing circuit 13, the memory occupation C33 of JPEG data on the JPEG data region R42 increases. After the compression processing circuit 13 stops at time tc, only releasing operation progresses, and the memory occupation C33 of JPEG data on the JPEG data region R42 decreases, finally becoming zero.

In FIG. 13, sum of memory occupation C31 of raw data in the raw data region R44, memory occupation C32 of YC data in the YC data region R43, and memory occupation C33 of JPEG data in the JPEG data region R42 is the total memory occupation C34. As shown in FIG. 13, the total memory occupation C34 is changing moment after moment. As clear from FIG. 13, the total memory occupation C34 reaches the maximum when the imaging circuit 11 finishes output of raw data R42 (time ta), and the total memory occupation C34 at this moment is the storage capacity required for imaging.

Comparing with a case not transferring by the recording circuit 15, the storage capacity required for imaging is decreased by amount of JPEG data which is transferred from start of transfer by the recording circuit 15 to end of outputting raw data by the imaging circuit 11. Therefore, the storage capacity required for imaging depends on the transfer speed to the recording medium, and becomes smaller as the transfer speed to the recording medium 200 is increased. Hence, the storage capacity C35 required for imaging is smaller than the JPEG data quantity of one image to be taken if the transfer speed to the recording medium 200 is sufficiently fast.

Thus, the storage capacity required for imaging is determined by cumulative calculation, but it can be obtained more easily by using the function of the up/down counter 77 of the MMU 20 for counting the number of pages in free regions.

Figure 14:
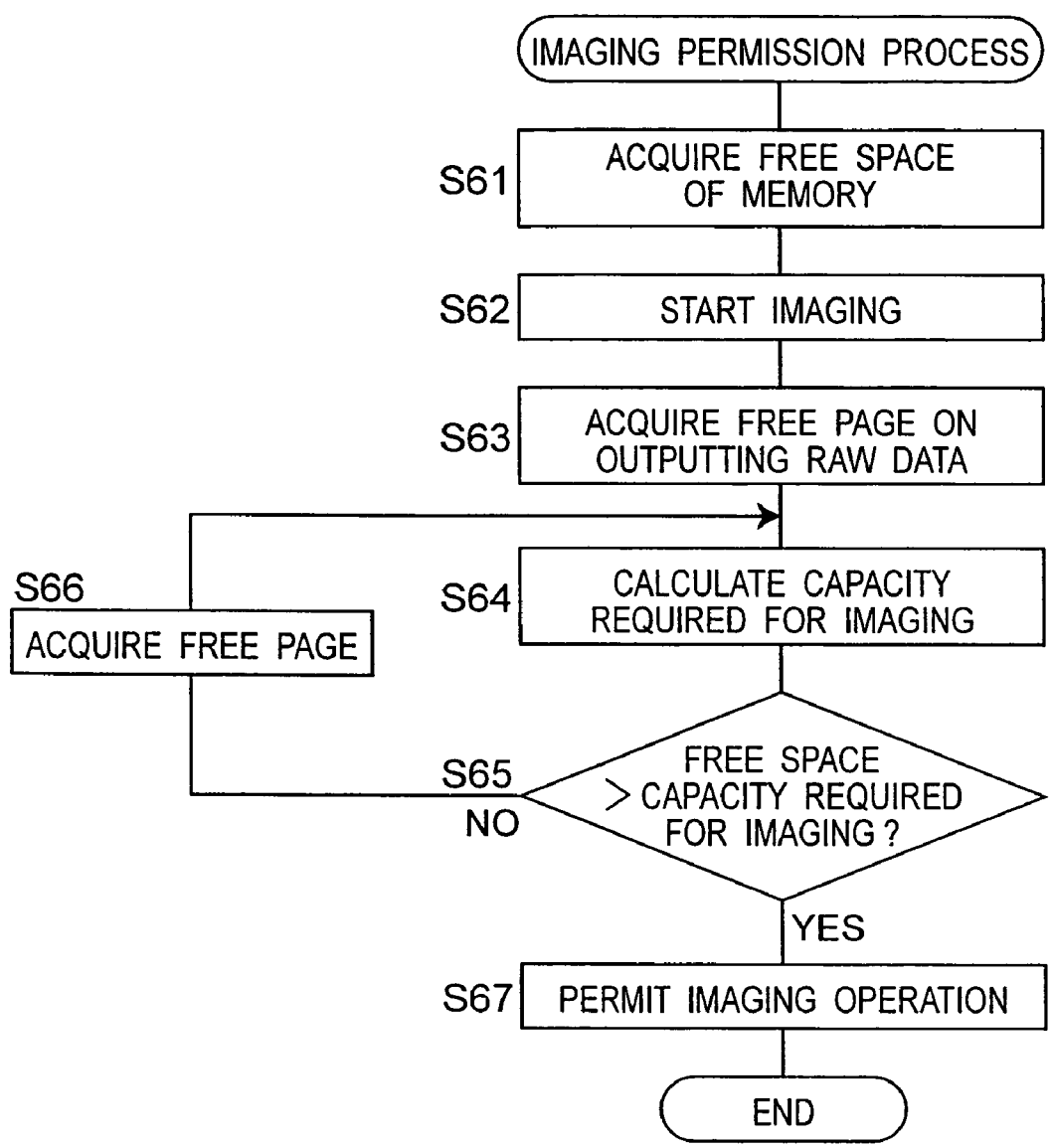
FIG. 14 is a flowchart of imaging permit operation.

On the basis of changes of memory capacity, the imaging permission process in the imaging apparatus is explained below while referring to the flowchart in FIG. 14.

Before start of imaging, the CPU 10 acquires the free capacity (number of free pages) of the memory 18 from the up/down counter 77, and stores (S61). After start of imaging, when the imaging circuit 11 finishes output of raw data, the number of free pages is acquired from the up/down counter 77, and stored (S63). The number of free pages acquired at the moment of output of raw data is subtracted from the number of free pages before start of imaging to determine the storage capacity required for imaging (that is, the number of pages required for imaging) (S64). The transfer speed to the recording medium 200 is not always constant even in the same recording medium, and thus it is preferred to have some allowance by multiplying the obtained value by a proper coefficient slightly larger than 1.

The number of pages required for imaging thus determined is compared with the read number of free pages, and it is judged whether imaging is possible at this moment (S65). If the number of pages required for imaging is larger than that of free pages read from the MMU 20, it is judged that imaging is impossible.

Meanwhile, since the transfer speed may vary depending on the recording medium 200, right after the recording medium 200 is replaced, the number of pages required for imaging cannot be predicted precisely. However, since the recording medium 200 is not replaced while JPEG data is left over in the memory 18, if the entire memory 18 is nearly free or vacant, it is unconditionally judged that imaging is possible. After repeating imaging operations at short intervals, the number of pages required for imaging has been already measured, and by comparing it with the number of free pages read from the MMU 20, it can be adequately judged whether imaging is possible at that moment.

If the imaging is judged to be impossible, the CPU 10 continues to read the number of free pages from the MMU 20 (S66), and when it exceeding the number of pages required for imaging, gives a permission of imaging to the imaging circuit 11 (S67). Since the number of free pages in the up/down counter 77 is measured moment after moment, it can be instantly judged whether imaging is possible by using the up/down counter 77.

Further, the MMU 20 stores the free capacity C37 before start of imaging as the number of free pages moment by moment, and predicts increase or decrease of free capacity C37 on the basis of the stored values. When predicting that the free capacity C37 keeps itself positive (that is, the free capacity is always maintained over zero), permission of imaging may be given to the imaging circuit 11. That is, the MMU 20 may be controlled to permit start of imaging operation of the imaging circuit 11. This prediction can be realized by monitoring the raw data sending speed of the imaging circuit 11 and change in free capacity C37.

In this manner, the imaging apparatus monitors the free capacity of the memory 18 by the number of pages, compares the number of pages of free capacity with that of pages corresponding to the storage capacity required for taking one image, and permits imaging when the free capacity is larger than the storage capacity necessary for taking at least one image. Thus, imaging is hardly disabled right after continuous shooting, or if impossible, imaging can be resumed in a shortest time.

In the imaging apparatus, if the memory capacity of the memory 18 is judged to be in shortage, the MMU 20 may assign the storage region of the memory 18 assigned to the display processing circuit 14, to a region storing raw data. Or, the CCD included in the imaging circuit 11 may be temporarily used for the memory 18. That is, when imaging is instructed on the operation unit 16, the imaging operation starts, and data output to the memory 18 from the CCD included in the imaging circuit 11 is stopped until the number of free pages is recovered to that necessary for taking one image. Thus, the CCD can be used for saving of raw data. In this way, even if the memory capacity of the memory 18 is insufficient, it is possible to compensate the defect and take an image so that the user rarely misses the shooting chance.

In this embodiment, the MMU 20 has interface circuits 21 to 25 corresponding to plural image processing circuits 11 to 15, but it is enough to provide only one interface circuit if registers 59, 61, and 63 for storing pages are provided corresponding to each image processing circuit.

INDUSTRIAL APPLICABILITY

The invention can be applied in electronic appliances having imaging functions. For example, it can be applied in digital still camera, digital video camera, analog camera, portable telephone terminal with camera, PHS terminal with camera, and others.

The invention is described about a specific embodiment, but it is evident for those skilled in the art that it can be changed, modified, and applied in various other forms. Hence the invention is not limited by the specific. disclosure alone, but is limited only by the appended scope of claims. This application is based upon and claims the benefit of priority from the prior Japanese Patent Application No. 2004-127811 (filed Apr. 23, 2004), the entire contents of which are incorporated herein by reference.

What is claimed is:

1. An imaging apparatus for taking images and recording them as digital data, comprising:
a memory that stores image data and having real address space;
an image processing circuit that has a specified image data processing function, and writes and/or reads data in specified data unit in the memory by using virtual address space;
a memory management unit that performs virtual memory control for managing the address of the memory by relating the real address space to the virtual address space, and
a CPU that controls the image processing circuit,
the memory management unit including:
an interface circuit that converts virtual address specified by the image processing circuit into real address, and
a correspondence registration circuit that has corresponding information for managing the correspondence between a virtual address unit region and a real address unit region, and sends the information about the real address unit region corresponding to the virtual address unit region in response to inquiry from the interface circuit, the virtual address unit region being a region of specified data unit in the virtual address space, the real address unit region being a region of specified data unit in the real address space,
wherein when the image processing circuit completes data read operation from the memory in specified data unit, the correspondence registration circuit deletes the correspondence between virtual address unit region and real address unit region for the read data in the corresponding information.

2. The imaging apparatus according to claim 1, wherein the interface circuit stores information about virtual address unit region which is previously accessed by the image processing circuit, compares the stored virtual address region with virtual address region which is newly requested to be accessed by the image processing circuit, and registers correspondence between real page and virtual page in the corresponding information about the correspondence registration circuit according to the comparison result.

3. The imaging apparatus according to claim 1, wherein the correspondence registration circuit includes a correspondence table storing the correspondence between real address unit region and virtual address unit region as corresponding information, and also includes a control circuit that searches real address unit region which does not have the corresponding virtual address unit region by referring to the correspondence table.

4. The imaging apparatus according to claim 1, wherein the correspondence registration circuit includes a free page table showing whether the real address unit region stores valid data in each real address unit region as corresponding information, and also includes a control circuit that searches real address unit region which does not have the corresponding virtual address unit region.

5. The imaging apparatus according to claim 4, wherein the correspondence registration circuit accesses the free page table during a period for which there is no access from the interface circuit, searches real address unit region which does not have the corresponding virtual address unit region, and stores the searching result in a predetermined storage region.

6. The imaging apparatus according to claim 1, wherein the CPU determines free capacity of the memory and capacity necessary for imaging, and permits imaging when the free capacity is larger than the capacity necessary for imaging.

7. The imaging apparatus according to claim 1, further comprising a plurality of image processing circuits, and an arbiter circuit that adjusts access right to the correspondence registration circuit among the plural image processing circuits.

8. The imaging apparatus according to claim 7, further comprising a display device as one of the image processing circuits, wherein in the memory the storage region assigned for the display device is assigned for storing data processed by the other image processing circuit.

9. The imaging apparatus according to claim 1, wherein the image processing circuit includes a CCD that converts optical information to an electrical signal, and the CCD is temporarily used for the memory.

10. An imaging apparatus for taking images and recording them as digital data, comprising:
a memory that stores image data and having real address space;
a plurality of image processing circuits each of which has a specified image data processing function and writes and/or reads data in specified data unit in the memory by using virtual address space;
a memory management unit that performs virtual memory control for managing the address of the memory by relating the real address space to the virtual address space, and
a CPU that controls the image processing circuit,
the memory management unit including:
a plurality of interface circuits each of which is provided for each imaging circuit and converts virtual address specified by the image processing circuit into real address,
a correspondence registration circuit that has corresponding information for managing the correspondence between a virtual address unit region and a real address unit region, and sends the information about the real address unit region corresponding to the virtual address unit region in response to inquiry from the interface circuit, the virtual address unit region being a region of specified data unit in the virtual address space, the real address unit region being a region of specified data unit in the real address space, and
an arbiter circuit that adjusts access right to the corresponding registering circuit among the plural interface circuits, and
wherein when the image processing circuit completes data read operation from the memory in specified data unit, the correspondence registration circuit deletes the correspondence between virtual address unit region and real address unit region for the read data in the corresponding information.

11. The imaging apparatus according to claim 10, wherein the interface circuit stores information about virtual address unit region which is previously accessed by the image processing circuit, compares the stored virtual address region with virtual address region which is newly requested to be accessed by the image processing circuit, and registers correspondence between real page and virtual page in the corresponding information about the correspondence registration circuit according to the comparison result.

12. The imaging apparatus according to claim 10, wherein the correspondence registration circuit includes a correspondence table storing the correspondence between real address unit region and virtual address unit region as corresponding information, and also includes a control circuit that searches real address unit region which does not have the corresponding virtual address unit region by referring to the correspondence table.

13. The imaging apparatus according to claim 10, wherein the correspondence registration circuit includes a free page table showing whether the real address unit region stores valid data in each real address unit region as corresponding information, and also includes a control circuit that searches real address unit region which does not have the corresponding virtual address unit region.

14. The imaging apparatus according to claim 13, wherein the correspondence registration circuit accesses the free page table during a period for which there is no access from the interface circuit, searches real address unit region which does not have the corresponding virtual address unit region, and stores the searching result in a predetermined storage region.

15. The imaging apparatus according to claim 10, wherein the CPU determines free capacity of the memory and capacity necessary for imaging, and permits imaging when the free capacity is larger than the capacity necessary for imaging.

16. The imaging apparatus according to claim 10, further comprising a display device as one of the image processing circuits, wherein in the memory the storage region assigned for the display device is assigned for storing data processed by the other image processing circuit.

17. The imaging apparatus according to claim 10, wherein the image processing circuit includes a CCD that converts optical information to an electrical signal, and the CCD is temporarily used for the memory.

* * * * *